United States Patent
Taylor, Jr. et al.

(10) Patent No.: US 9,612,325 B2
(45) Date of Patent: Apr. 4, 2017

(54) UNWRAPPING AND PREDICTION OF DISTANCE AND VELOCITY MEASUREMENTS USING CARRIER SIGNALS

(71) Applicant: ENSCO, Inc., Springfield, VA (US)

(72) Inventors: David W. A. Taylor, Jr., Greensboro, NC (US); Bradley David Farnsworth, Alexandria, VA (US); Edward Joseph Kreinar, Fairfax, VA (US)

(73) Assignee: ENSCO, INC., Falls Church, VA (US)

( * ) Notice: Subject to any disclaimer, the term of this patent is extended or adjusted under 35 U.S.C. 154(b) by 476 days.

(21) Appl. No.: 14/293,622

(22) Filed: Jun. 2, 2014

(65) Prior Publication Data

US 2015/0346332 A1    Dec. 3, 2015

(51) Int. Cl.
*G01S 3/02* (2006.01)
*G01S 13/84* (2006.01)

(52) U.S. Cl.
CPC .................................. *G01S 13/84* (2013.01)

(58) Field of Classification Search
CPC .................................. G01S 3/02; G01S 13/84
USPC .......................................................... 342/458
See application file for complete search history.

(56) References Cited

U.S. PATENT DOCUMENTS

| | | | |
|---|---|---|---|
| 5,278,563 A | 1/1994 | Spiess | |
| 6,054,950 A | 4/2000 | Fontana | |
| 6,122,329 A | 9/2000 | Zai et al. | |
| 6,469,654 B1 * | 10/2002 | Winner | G01S 3/46 342/33 |
| 6,594,617 B2 | 7/2003 | Scherzinger | |
| 7,239,277 B2 | 7/2007 | Fullerton | |
| 8,199,047 B2 | 6/2012 | Fretenburg et al. | |
| 8,224,575 B2 | 7/2012 | Faulkner et al. | |
| 8,274,426 B2 | 9/2012 | Lee | |
| 8,380,218 B2 | 2/2013 | Gfeller et al. | |

(Continued)

OTHER PUBLICATIONS

Belostotski, L., et al., "Distance Measurement with Phase-Stable CW Radio Link Using the Chinese Remainder Theorem", Electronics Letters, vol. 37, No. 8, Apr. 12, 2001, pp. 521-522.
Belostotski, L., et al., "A Technique for Microwave Ranging and Remote Phase Synchronization", IEEE Transactions on Instrumentation and Measurement, vol. 51, No. 3, Jun. 2002, pp. 551-559.

(Continued)

*Primary Examiner* — Harry Liu
(74) *Attorney, Agent, or Firm* — Finnegan, Henderson, Farabow, Garrett & Dunner, L.L.P.

(57) ABSTRACT

Systems and methods for performing distance and velocity measurements, such as by using carrier signals, are disclosed. A measurement method may include transmitting a first signal from an originator device to a transponder device and determining a carrier phase of the first signal at the transponder device. The measurement method may also include transmitting a second signal from the transponder device to the originator device and determining a carrier phase of the second signal at the originator device. The measurement method may include estimating a relative distance between the originator device and the transponder device using the carrier phase of the first carrier signal, the carrier phase of the second carrier signal. The method may also include estimating the relative distance using a frequency difference. The method may include using an adjusted relative distance to determine a total distance between the originator device and the transponder device.

24 Claims, 13 Drawing Sheets

(56) References Cited

U.S. PATENT DOCUMENTS

| | | | |
|---|---|---|---|
| 8,473,241 B2 | 6/2013 | Foxlin | |
| 8,583,145 B2 | 11/2013 | Karr et al. | |
| 2002/0101912 A1* | 8/2002 | Phelts | G01S 19/22 |
| | | | 375/148 |
| 2002/0143491 A1 | 10/2002 | Scherzinger | |
| 2005/0099333 A1* | 5/2005 | Gila | G01S 13/348 |
| | | | 342/118 |
| 2006/0214848 A1 | 9/2006 | Roberts | |
| 2007/0257836 A1 | 11/2007 | Chaplin | |
| 2008/0077326 A1 | 3/2008 | Funk et al. | |
| 2009/0111616 A1 | 4/2009 | Creelman | |
| 2010/0225541 A1 | 9/2010 | Hertzog | |
| 2011/0125063 A1 | 5/2011 | Shalon et al. | |
| 2011/0238308 A1 | 9/2011 | Miller et al. | |
| 2011/0273334 A1* | 11/2011 | Karr | G01S 13/825 |
| | | | 342/378 |
| 2012/0133558 A1 | 5/2012 | Fretenburg et al. | |
| 2012/0177088 A1 | 7/2012 | Bonin et al. | |
| 2013/0130843 A1 | 5/2013 | Burroughs et al. | |
| 2014/0203970 A1 | 7/2014 | Taylor, Jr. | |
| 2014/0203971 A1 | 7/2014 | Taylor, Jr. | |
| 2014/0207374 A1 | 7/2014 | Taylor, Jr. | |
| 2014/0248841 A1 | 9/2014 | Kluge et al. | |
| 2015/0116146 A1* | 4/2015 | Dickman | G01S 19/23 |
| | | | 342/357.51 |
| 2015/0296348 A1 | 10/2015 | Ghabra | |
| 2015/0312712 A1 | 10/2015 | Vock et al. | |

OTHER PUBLICATIONS

Brand, Timothy, et al., "Foot-to-Foot Range Measurement as an Aid to Personal Navigation", ION 59$^{th}$ Annual Meeting/CIGTF 22$^{nd}$ Guidance Test Symposium, Jun. 23-25, 2003, Albuquerque, NM, pp. 113-121.

Foxlin, Eric, "Pedestrian Tracking with Shoe-Mounted Inertial Sensors", IEEE Computer Society, Nov./Dec. 2005, pp. 38-46.

Keller, Michael, "GPS-Free Tech Can Track Miners' and Soldiers' Boots Underground", Scientific American, 2012.

Brown III, D. Richard, et al., "Time-Slotted Round-Trip Carrier Synchronization for Distributed Beamforming", IEEE Transactions on Signal Processing, vol. 56, No. 11, Nov. 2008, pp. 5630-5643.

Kelly, Alonzo, "Personal Navigation System Based on Dual Shoe-Mounted IMUs and Intershoe Ranging", Personal Precision Locator Workshop, Aug. 1, 2011, pp. 1-28.

Laverne, Michel, et al., "Experimental Validation of Foot to Foot Range Measurements in Pedestrian Tracking", Proceedings of the 24$^{th}$ International Technical Meeting of the Satellite Division of the Institute of Navigation (ION GNSS 2011), Sep. 2011.

Duncan, Juan Carlos Merlano, "Phase Synchronization Scheme for Very Long Baseline Coherent Arrays", Department of Signal Theory and Communications, Barcelona, Jul. 2012.

"Real Time Kinematic," Webpage, Available at en.wikipedia.org/wiki/Real_Time_Kinematic, Last Downloaded Dec. 20, 2013.

"Differential Correction—Carrier Phase Vs. Code Phase," National Park Service, available at www.nps.gov.

"Carrier Recovery," Webpage, Available at http://en.wikipedia.org/wiki/Carrier_recovery, Last Downloaded Dec. 20, 2013.

* cited by examiner

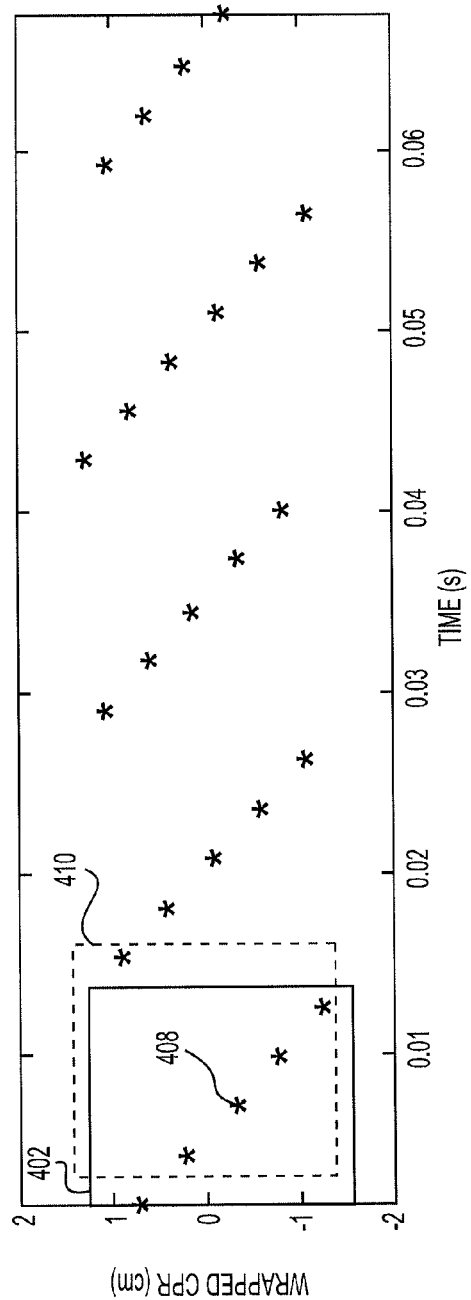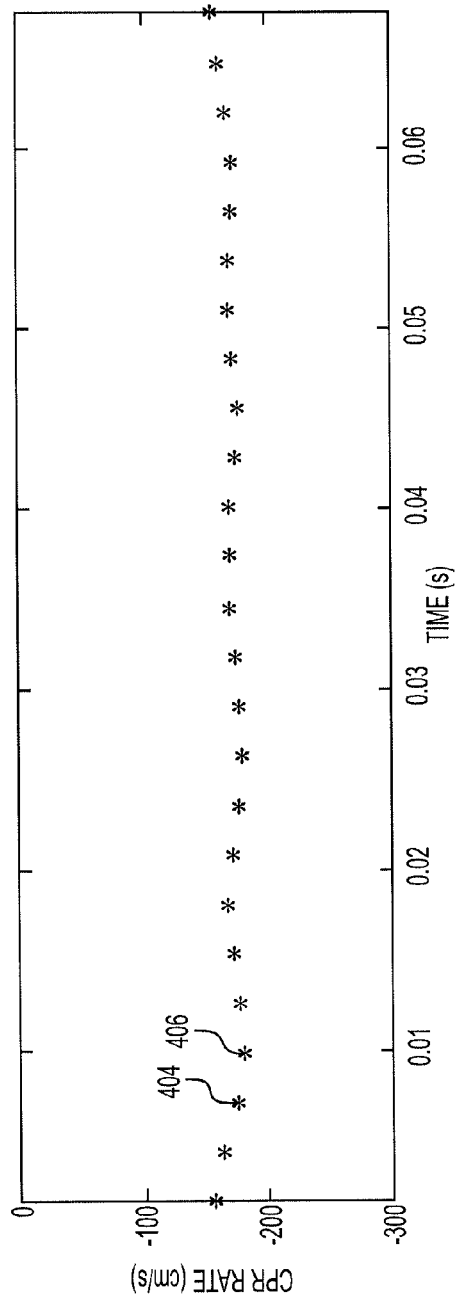

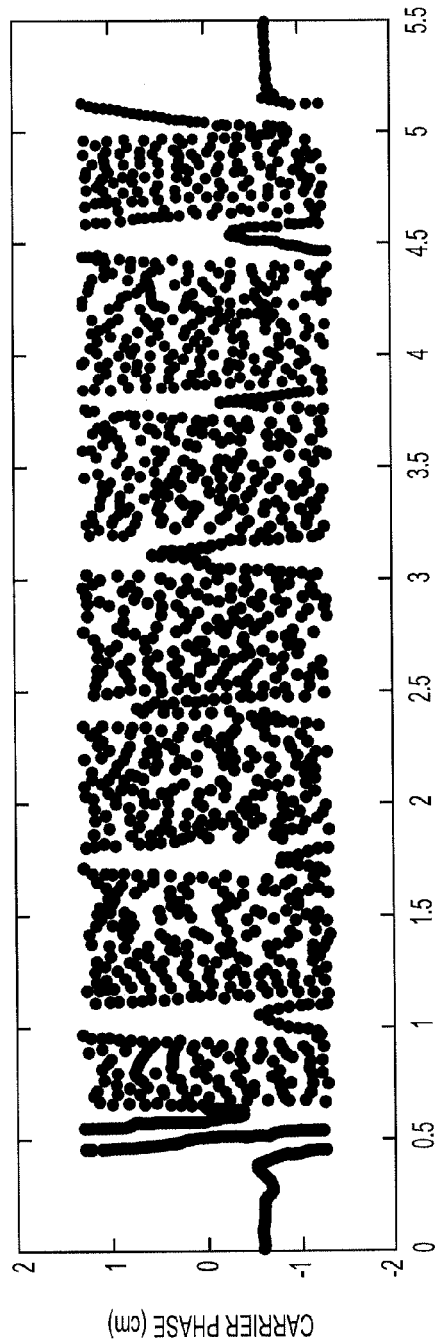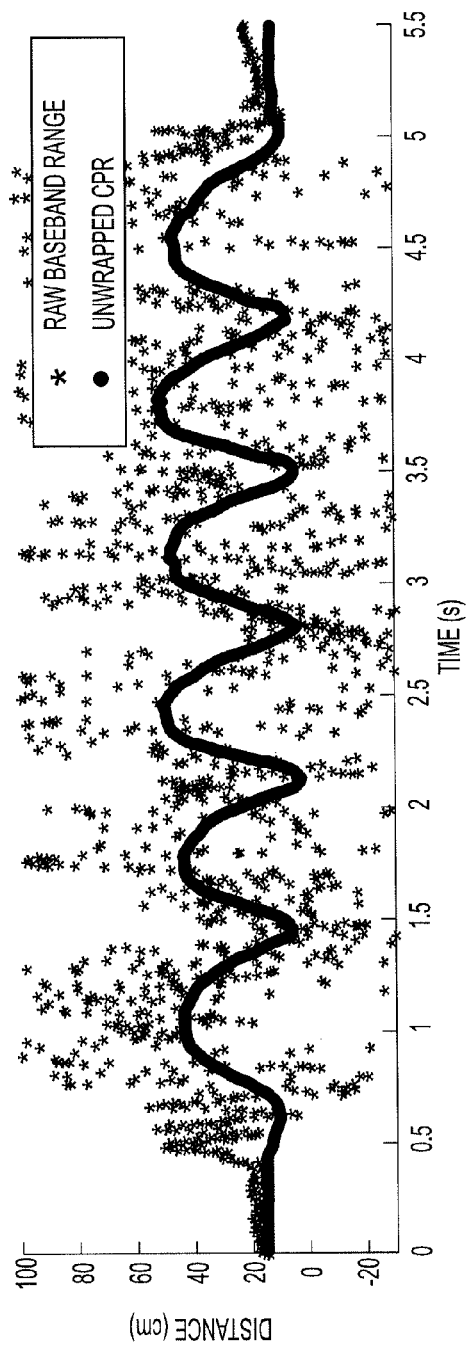
FIG. 9A
FIG. 9B

UNWRAPPING AND PREDICTION OF DISTANCE AND VELOCITY MEASUREMENTS USING CARRIER SIGNALS

RELATED APPLICATIONS

This disclosure contains subject matter related to co-filed U.S. patent application Ser. No. 14/293,500, entitled "Distance and Velocity Measurements Using Carrier Signals," and Ser. No. 14/293,561, entitled "Carrier Phase Distance and Velocity Measurements," both filed Jun. 2, 2014, the entire contents of both of which are herein incorporated by reference.

BACKGROUND

Technical Field

This disclosure relates to distance and velocity measurements using carrier signals. This disclosure also relates to estimating or tracking a position of an object.

Description of Related Art

Radio-frequency (RF) ranging technology may be used to provide a distance and relative position between objects having communication radios without the need to take mechanical measurements. Some RF ranging systems calculate the distance between two objects based in part on the time it takes a radio signal to propagate between those objects. In air, radio signals propagate at a constant rate, roughly equal to the speed of light. Digital data communications and RF systems may employ a variety of methods to encode digital data within an RF carrier signal.

Knowing the absolute position of a sufficient number of objects (such as, for example, cellular telephone towers fixed relative to the earth), an RF ranging system can be used to determine the absolute position of other radio-containing objects. Some RF ranging systems may utilize a signal from the Global Positioning System (GPS) to verify absolute location. In many situations, however, GPS signals are either unavailable or actively denied to a potential user. RF ranging systems can provide accurate information regarding distance or location even in locations or situations without access to GPS signals. Some positioning systems, for example, GPS-based systems, measure a time difference of arrival (TDOA) of several synchronized signals to aid in position calculations.

One problem with GPS-based tracking devices is that when GPS is unavailable, the system can no longer track the object with a high degree of accuracy. GPS may be unavailable in various locations: underground or other locations below surrounding terrain, such as mines, canyons, caves, tunnels, bunkers, and basements; urban locations, such as in or between skyscrapers and other large buildings; or locations with active interference of GPS signals or high levels of electromagnetic interference, such as signal jamming.

To compensate for the lack of GPS, some measurement systems rely on "dead reckoning" to estimate the position of an object. In dead reckoning, the current position of an object is estimated by measuring the course, speed, and time elapsed since the object was in a known prior position. For example, a person who is orienteering may utilize dead reckoning. By multiplying their average speed by the elapsed time, the person can estimate a total distance travelled. Using a map, the person can thus plot their path from a known starting position along a measured compass course. Dead reckoning, however, is only as reliable as the data used. In the orienteering example, error may be introduced in the estimates of the course travelled, the average speed, or the elapsed time. Some dead reckoning technology uses inertial navigation systems, which may include inertial measurement units, to track the position of an object over time. Although inertial navigation systems helped address some sources of error, they are still prone to inaccurate measurements and navigation errors.

Some dead reckoning systems include RF ranging systems that may utilize a round-trip time-of-flight measurement to compute the distance between two radios. These types of systems can be further classified into round-trip "full-duplex" configurations and round-trip "half-duplex" configurations. An example of half-duplex and full-duplex round-trip time-of-flight measurements is described in U.S. Pat. Nos. 8,199,047 and 8,314,731 (which are assigned to the same assignee as the present disclosure).

In a round-trip half-duplex configuration, a first radio transmits a signal to a second radio, which then performs calculations using that signal. The second radio then transmits a new signal, which may contain the results of the calculations performed by the second radio, back to the first radio. The first radio then utilizes the data from the second radio and other data within the first radio to calculate the round-trip signal propagation time. The system multiplies this time by the speed of light and divides by two to estimate the distance between the two radios.

Because round-trip range measurements between radios require each radio to transmit a signal to the other radio, errors may be introduced by differences between the transmitted baseband frequencies or carrier frequencies of each radio. For example, even radios with the same nominal frequency (e.g., 2.4 GHz) will have slight variations in their actual transmission frequencies due to the manufacturing tolerances or local oscillator drift or instability. Errors may also be introduced by the relative motion between the radios, resulting in Doppler shifts in the transmitted signals. These variations cause errors in measurements that may compound over time, leading to tracking or navigation errors.

When determining the position of an object, calculations may be performed by a data processor. The calculations may inherently produce finite errors in the real-time estimates of the position, velocity, and attitude, collectively known as "navigation errors." If uncorrected, these errors grow unbounded with time. To help bound navigation errors, it is common in the art to employ various filtering techniques. One class of filters is known as Kalman filters. The term "Kalman filter" will be used to collectively refer to members and variants in this class of filters, including but not limited to extended Kalman filters (EKF) and unscented Kalman filters (UKF). Another class of filters includes particle filters.

Another source of errors in RF navigation systems is multipath interference. These types of errors are introduced when a signal transmitted between two radios reflects off of objects, such as the ground, buildings, walls, or vehicles. These signals are also received by the receiving radio, but followed a different path to reach the receiving radio. Multipath interference introduces errors or inaccurate measurements by artificially increasing the perceived distance between objects.

Although improvements to navigation systems and measurement systems have been developed over time, there remains a need for an improved tracking and location system that obviates or at least mitigates one or more of the shortcomings of previous techniques to allow more accurate computation of the current or real-time position.

SUMMARY

The present disclosure describes systems and methods for performing distance and velocity measurements, such as, by using carrier signals.

According to a first aspect of this disclosure, a measurement method may include transmitting a first signal from an originator device to a transponder device, the first signal having a first carrier frequency; and determining a carrier phase of the first signal at the transponder device. The measurement method may also include transmitting a second signal from the transponder device to the originator device, the second signal having a second carrier frequency; and determining a carrier phase of the second signal at the originator device. The measurement method may further include estimating a relative distance between the originator device and the transponder device using the carrier phase of the first carrier signal and the carrier phase of the second carrier signal. The relative distance may wrap across an upper boundary. The relative distance may wrap across a lower boundary. The method may further include adjusting the relative distance by unwrapping the relative distance outside at least one of the upper boundary and the lower boundary. The method may include using the adjusted relative distance to determine a total distance between the originator device and the transponder device.

According to another aspect, the method may include using a frequency difference between the first carrier frequency and the second carrier frequency to estimate the relative distance.

According to another aspect, unwrapping the relative distance may include adding a predetermined distance to the relative distance. According to another aspect, unwrapping the relative distance may include subtracting a predetermined distance to the relative distance. The predetermined distance may correspond to a difference between the upper boundary and the lower boundary.

According to a further aspect, unwrapping the relative distance may include determining a relative motion between the originator device and the transponder device over a predetermined time interval and adding the relative motion to the relative distance.

According to another aspect of this disclosure, determining the relative motion may include determining a rate of change of the carrier phase of the first signal at the transponder device and determining a rate of change of the carrier phase of the second signal at the originator device. Determining the relative motion may also include using the rate of change of the carrier phase of the first signal at the transponder device and the rate of change of the carrier phase of the second signal at the originator device to determine the relative motion.

According to still another aspect, determining the relative motion may include estimating a plurality of relative distances between the originator device and the transponder device. The plurality of relative distances may be calculated based on a plurality of carrier phases of a first plurality of signals transmitted from the originator device to the transponder device, a plurality of carrier phases of a second plurality of signals transmitted from the transponder device to the originator device, and a plurality of frequency differences between the carrier frequencies of the first plurality of signals and the carrier frequencies of the second plurality of signals. According to another aspect, determining the relative motion may include estimating the relative motion based on a rate of change of the plurality of relative distances, and adjusting the plurality of relative distances by unwrapping the plurality of relative distances across the upper boundary. According to another aspect, determining the relative motion may include estimating the relative motion based on a rate of change of the plurality of relative distances, and adjusting the plurality of relative distances by unwrapping the plurality of relative distances across the lower boundary.

According to still another aspect, using the adjusted relative distance to determine the total distance may include determining an offset distance between the originator device and the transponder device and adding the offset distance to the adjusted relative distance.

According to still a further aspect, determining the offset distance may include performing a round-trip time-of-flight measurement between the originator device and the transponder device.

According to still another aspect, the method may include estimating a future position of transponder device using the relative distance and the relative motion.

According to yet a further aspect, using the adjusted relative distance to determine the total distance may include updating an estimate of the total distance using a tracking filter. The adjusted relative distance and the relative motion may be inputs to the tracking filter.

According to another aspect of this disclosure, a measurement system may include an originator device including a first radio. The originator device may be configured to transmit a first signal to a transponder device using the first radio, the first signal having a first carrier frequency. The transponder device may include a second radio. The transponder device may be configured to transmit a second signal to the originator device using the second radio, the second signal having a second carrier frequency. The measurement system may include processor may be configured to estimate a relative distance between the originator device and the transponder device using a carrier phase of the first signal at the transponder device and a carrier phase of the second signal at the originator device. The relative distance may be bounded by an upper boundary and a lower boundary. The processor may be configured to adjust the relative distance by unwrapping the relative distance outside at least one of the upper boundary and the lower boundary. The processor may be configured to use the adjusted relative distance to determine a total distance between the originator device and the transponder device.

According to another aspect, the processor may be further configured to estimate the relative distance between the originator device and the transponder device using a frequency difference between the first carrier frequency and the second carrier frequency.

According to still another aspect, the processor may be configured to unwrap the relative distance by adding or subtracting a predetermined distance to the relative distance. The predetermined distance may correspond to a difference between the upper boundary and the lower boundary.

According to still a further aspect, the processor may be configured to unwrap the relative distance by determining a relative motion between the originator device and the transponder device over a predetermined time interval, and adding the relative motion to the relative distance.

According to still another aspect, the processor may be configured to determine the relative motion by determining a rate of change of the carrier phase of the first signal at the transponder device, determining a rate of change of the carrier phase of the second signal at the originator device, and using the rate of change of the carrier phase of the first signal at the transponder device and the rate of change of the carrier phase of the second signal at the originator device to determine the relative motion.

According to still a further aspect, the processor may be further configured to determine the relative motion by estimating a plurality of relative distances between the originator device and the transponder device. The plurality of relative distances may be calculated based on a plurality of carrier phases of a first plurality of signals transmitted from the originator device to the transponder device, a plurality of carrier phases of a second plurality of signals transmitted from the transponder device to the originator device, and a plurality of frequency differences between the carrier frequencies of the first plurality of signals and the carrier frequencies of the second plurality of signals. According to an aspect, determining the relative motion may include adjusting the plurality of relative distances by unwrapping the plurality of relative distances across the upper boundary. According to another aspect, determining the relative motion may include adjusting the plurality of relative distances by unwrapping the plurality of relative distances across the lower boundary to determine an adjusted plurality of relative distances. Determining the relative motion may also include estimating the relative motion based on a rate of change of the adjusted plurality of relative distances.

According to still a further aspect, the processor may be configured to use the adjusted relative distance to determine the total distance by determining an offset distance between the originator device and the transponder device. The offset distance may be added to the adjusted relative distance.

According to another aspect, the processor may be configured to determine the offset distance by performing a round-trip time-of-flight measurement between the originator device and the transponder device.

According to yet another aspect, the processor may be configured to estimate a future position of the transponder device using the relative distance and the relative motion.

According to still another aspect, the processor may be configured to use the adjusted relative distance to determine the total distance by updating an estimate of the total distance using a tracking filter. The adjusted relative distance and the relative motion may be inputs to the tracking filter.

BRIEF DESCRIPTION OF THE DRAWINGS

FIGS. 4A and 4B show exemplary carrier phase range data and exemplary carrier phase velocity.

FIGS. 9A and 9B show exemplary carrier phase range data measured using a boot-to-boot navigation system.

It is to be understood that both the foregoing general description and the following detailed description are exemplary and explanatory only. They are not restrictive of the scope of the invention as claimed.

DESCRIPTION OF THE EXEMPLARY EMBODIMENTS

The present disclosure describes systems and methods for performing distance and velocity measurements using carrier signals. A carrier signal generally describes a waveform used to modulate an underlying signal, such as a baseband signal or data signal. The phase of the carrier signal may be used to estimate a distance between a transmitting radio and a receiving radio or to estimate the relative motion between a transmitting radio and a receiving radio.

A "carrier phase" or "phase of a carrier signal," as used herein, generally refers to the phase of an RF carrier signal relative to the local oscillator (LO) of a receiving radio.

A "radio," as used herein, generally refers to a device that radiates, emits, transmits, or receives electromagnetic signals (such as RF signals), or any combination thereof. Such devices may be generally referred to as "emitters," "transmitters," "receivers," or "transceivers" in the art and may radiate, emit, transmit, or receive electromagnetic signals, or any combination thereof. Radios may also include single- or multiple-input, single- or multiple-output devices (SISO, SIMO, MISO, and MIMO) which enable transmitter or receiver diversity. Such devices may include one or more radiating elements, emitting elements, transmitting elements, receiving elements, or transceiving elements, or any combination thereof, depending on the type of signal being radiated, emitted, transmitted or received. The radiating elements, emitting elements, transmitting elements, receiving elements, or transceiving elements may include metallic or non-metallic elements. The radiating elements, emitting elements, transmitting elements, receiving elements, or transceiving elements of a radio may also be referred to as "antennas" in this disclosure. A radio may have more than one antenna.

A radio may include a polarization of the electromagnetic signal emitted from the radio. Exemplary polarizations include linear (vertical or horizontal), circular (right-hand or left-hand), or elliptical polarization. The radios of the present disclosure may have any polarization, although some applications may be further improved through the use of specific polarizations, such as, for example, circular polarization for foot-to-foot ranging.

Figure 1:
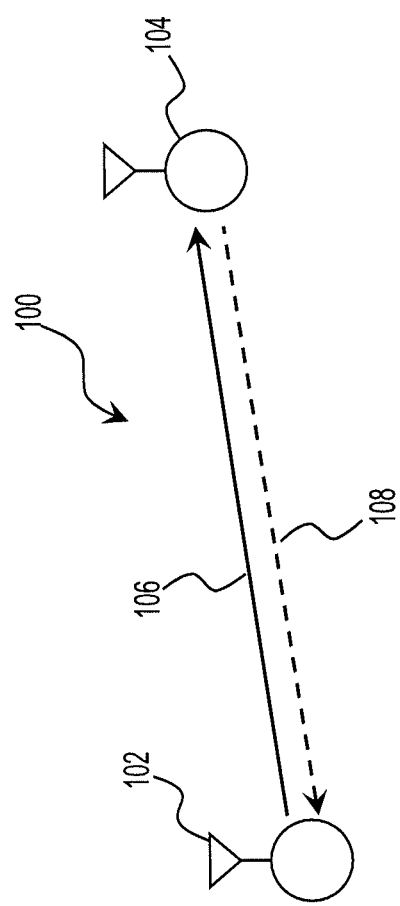
FIG. 1 shows a pair of radios for performing exemplary ranging and velocity measurements.

FIG. 1 shows an exemplary system 100 having two radios. According to some embodiments, radio 102 can be an originator radio for a round-trip measurement and radio 104 can be a transponder radio for a round-trip measurement. For example, round-trip time-of-flight measurement can be performed between originator radio 102 and transponder radio 104 using wireless signals 106 and 108. Wireless signal 106 is transmitted, for example, from originator radio 102 to transponder radio 104, while wireless signal 108 is transmitted from transponder radio 104 to originator radio 102.

Wireless signals 106 and 108 may contain data packets. The structure of a data packet may include a preamble, synchronization word or frame, and data payload. The synchronization word may consist of one or more symbols, or a frame within the data packet. According to some embodiments, signals 106 and 108 may include pseudo noise-coded, or "PN-coded," messages. Each PN-coded message may consist of three parts: a preamble of a plurality of PN code sequences, a synchronization word, and a payload of data. Signals 106 and 108 are not limited to PN-coded messages or messages in this format, however, and other formats may be used, such as messages having more than one synchronization word or frame, or other variations known in the art.

According to some embodiments, as described in greater detail below, the carrier frequencies of signals 106 and 108 can be used to determine information about the relative distance between radios 102 and 104 and also the relative motion between radios 102 and 104. For example, variations and differences in carrier frequencies and frequency shifts caused by motion between radios 102 and 104 were previously considered sources of measurement error. As described below, however, these variations may actually be used to improve ranging and velocity measurements.

Furthermore, unlike some ranging and tracking systems (e.g., GPS), the measurements in this disclosure do not require phase or clock synchronization between a transmitting radio and a receiving radio. Therefore, the transmitting and receiving devices may have unsynchronized clocks and do not require phase-locked loops or other methods known in the art to synchronize oscillators between the transmitter and receiver, such as, for example, sigma-delta modulators or delay-lock loops. Accordingly, each measurement can be viewed as a discrete measurement, which may reduce the cost of such systems because it mitigates the need for synchronized clocks and phase locking between the transmitter and receiver. Furthermore, if one of the synchronized clocks drifts, it could introduce further errors into a measurement.

Distance measurements and tracking between two or more objects may be improved using one or more of the measurement techniques described below. These measurements may be determined alone or in combination, depending on the particular system or application in which they are implemented.

Carrier Phase Ranging (CPR)

According to some embodiments, the carrier frequencies of wireless signals transmitted between two radios, such as originator radio 102 and transponder radio 104, can be used to calculate a relative distance between radios 102 and 104. The relative distance measured using the carrier phases received at an originator radio 102 and a transponder radio 104 is referred to as the carrier phase range, or "CPR."

The carrier phase represents the phase of a carrier signal relative to a receiving radio's local oscillator (LO). In a round-trip time-of-flight measurement, each of originator radio 102 and transponder radio 104 will function as the receiving radio of wireless signals 106 and 108, respectively. According to some embodiments, the LO of originator radio 102 and transponder radio 104 can be used to generate the carrier frequency of the signals 106 and 108, respectively. The relationship between a LO frequency and a carrier frequency depends on the type of radio selected. For example, the LO frequency may be equal to the carrier frequency.

A transmitted signal, s(t), at a time t can be described as the combination of a complex waveform to be transmitted, g(t), and the carrier waveform, c(t). The transmitted signal (e.g., signal 106 or 108) can be described by the equation $$s(t) = A \cdot g(t) \cdot c(t) \quad (1)$$

such that $$c(t) = \cos(2\pi f_c t + \theta(t_0)) \quad (2)$$

where $f_c$ describes the frequency of the carrier waveform, $\theta(t_0)$ describes the phase of the carrier waveform at the start time of the transmission, and A describes the gain of the system. The waveform to be transmitted, g(t), may represent data for transmission, such as baseband data or a data packet. In some embodiments, g(t) may be a slowly varying function having a frequency on the order of megahertz (MHz), and c(t) may be a rapidly varying function having a frequency on the order of gigahertz (GHz).

The combined transmitted waveform, s(t), can be written as $$s(t) = A_1 \cdot \cos(2\pi f_c t + \theta(t_0) + \phi(t-t_0)) \quad (3)$$

where $A_1$ describes the gain of the system, $\theta(t_0)$ describes the carrier phase at the start time $t_0$, and $\phi(t-t_0)$ describes the phase modulation from mixing the carrier signal c(t) with the signal to be transmitted g(t).

A receiving radio may receive the waveform s(t) at a received time $t_r$. The receive time, $t_r$, can be represented by a combination of start time, $t_0$, and the propagation time, $t_x$, from the transmitting radio to the receiving radio. The receiving radio may separate the complex waveform s(t) into separate in-phase i(t) and quadrature q(t) channels. The in-phase and quadrature channels can be separated from the complex waveform s(t) by multiplying by sine and cosine functions of a local oscillator (LO) having a frequency $f_r$, such that the in-phase channel can be described by the equation $$i(t) = \cos(2\pi f_c t + \theta(t_0)) \cdot \cos(2\pi f_r t + \theta_r(t_r)) \quad (4)$$

$$= \cos(2\pi f_c t + \theta(t_0)) \cdot \cos(2\pi f_r t + \theta_r(t_0 + t_x)) \quad (5)$$

The labels "transmitting" and "receiving" are used only to facilitate understanding of this description, as it is contemplated that each radio may transmit and receive wireless signals, according to some embodiments.

Applying a standard trigonometric identity for multiplying cosine functions, and filtering out the resulting high-frequency term ($f_c + f_r$), the in-phase channel can be described by $$i(t) \approx \frac{1}{2} \cos(2\pi (f_c - f_r) t + \theta(t_0) - \theta_r(t_0 + t_x)) \quad (6)$$

Similarly, the quadrature channel can be described by the equation $$q(t) = \cos(2\pi f_c t + \theta(t_0)) \cdot \sin(2\pi f_r t + \theta_r(t_r)) \quad (7)$$

$$= \cos(2\pi f_c t + \theta(t_0)) \cdot \sin(2\pi f_r t + \theta_r(t_0 + t_x)) \quad (8)$$

Applying a standard trigonometric identity for multiplying sine and cosine functions, and filtering out the resulting high-frequency term ($f_c + f_r$), the quadrature channel can be described by $$q(t) \approx -\frac{1}{2} \sin(2\pi (f_c - f_r) t + \theta(t_0) - \theta_r(t_0 + t_x)) \quad (9)$$

Thus, each of the in-phase and quadrature channels at a given time, t, can be described in terms of a carrier phase measurement, φ(t), such that $$i(t) \approx \frac{1}{2}\cos(\varphi(t)) \qquad (10)$$

and $$q(t) \approx -\frac{1}{2}\sin(\varphi(t)) \qquad (11)$$

where $$\varphi(t) = 2\pi(f_c - f_r)t + \theta(t_0) - \theta_r(t_0 + t_x) \qquad (12)$$

The observed data of the carrier phase measurement, φ(t), is bounded by 2π. It is possible, however, to "unwrap" this carrier phase measurement as a linear equation in slope-intercept form (y=mx+b). The carrier phase slope, $2\pi(f_c-f_r)$, which can be in units of radians per second, is a function of the difference between the carrier frequency ($f_c$) and the receiving radio's LO frequency ($f_r$). This slope may be referred to as the "spin rate" of the received IQ constellation with respect to the receiving radio's LO carrier phase. The intercept, $\theta(t_0)-\theta_r(t_0+t_x)$, represents the difference in the phase between the transmitting radio ($\theta(t_0)$) and the receiving radio ($\theta_r(t_0+t_x)$). This term may be referred to as the "phase offset."

For the two legs of a round-trip measurement, the phase offset at a transponder radio 104 (denoted by the subscript T) and an originator radio 102 (denoted by the subscript O) can be described as $$\phi_T = \theta_O(t_0) - \theta_T(t_0 + t_x) \qquad (13)$$

for a signal transmitted from an originator radio 102 to a transponder radio 104, and $$\phi_O = \theta_T(t'_0) - \theta_O(t'_0 + t_x) \qquad (14)$$

for a signal transmitted from the transponder radio 104 to the originator radio 102. In the above equations, $\theta_O$ describes the phase at the originator radio 102 at a particular time, $\theta_T$ describes the phase at the transponder radio at a particular time, $t_0$ describes the start time of transmission of a signal from the originator radio 102 to the transponder radio 104, $t'_0$ describes the start time of transmission of a signal from the transponder radio 104 to the originator radio 102, and $t_x$ describes the transmission time of a signal transmitted between the originator radio 102 and the transponder radio 104. According to some embodiments, it can be assumed that the transmission time $t_x$ is the same for both legs of the round-trip measurement. This assumption can be made, for example, when the change in distance over the duration of the round-trip measurement (e.g., about 1-5 ms) will be negligible for the applications.

The carrier phase offsets at originator radio 102 and transponder radio 104 can be added together and solved in terms of respective LO frequencies (e.g., carrier frequencies) to determine the relative distance between the two radios. Adding the phases yields $$(\phi_T + \phi_O) = [\theta_O(t_0) - \theta_T(t_0 + t_x)] + [\theta_T(t'_0) - \theta_O(t'_0 + t_x)] \qquad (15)$$

Substituting the value of $2\pi f_{T/O} t_x$ for the phase $\theta_{T/O}(t_x)$ at the transponder radio 104 and originator radio 102, respectively, yields $$\varphi_T + \varphi_0 = [\theta_O(t_0) - \theta_T(t_0) - 2\pi f_T t_x] + [\theta_T(t'_0) - \theta_O(t'_0) - 2\pi f_O t_x] \qquad (16)$$

$$= -2\pi(f_O + f_T)t_x + [\theta_O(t_0) - \theta_O(t'_0)] + [\theta_T(t'_0) - \theta_T(t_0)] \qquad (17)$$

where $f_T$ represents the carrier frequency transmitted from the transponder radio 104, and $f_O$ represents the carrier frequency transmitted from the originator radio 102.

The phases $\theta_O$ and $\theta_T$ of equation (17) may also be described by the equations $$[\theta_O(t_0) - \theta_O(t'_0)] = 2\pi f_O(t_x + t_p + t_{tt}) \qquad (18)$$

and $$[\theta_T(t'_0) - \theta_T(t_0)] = -2\pi f_T(t_x + t_p + t_{tt}) \qquad (19)$$

where $t_p$ describes a measurement duration from the start of transmission of the wireless signal to a predetermined part in the signal, such as a synchronization word or frame, and $t_{tt}$ describes the turn-around time at the transponder radio 104. The turn-around time of the transponder radio 104 may correspond to the time between the receipt and transmission of the same predetermined part in the wireless signals. For example, the turn-around time at the transponder may correspond to the time difference between the start of a synchronization word or frame in a wireless signal 106 received by the transponder radio from the originator radio 102 and the time that the synchronization word or frame is transmitted in a return signal 108 from the transponder radio 104 to the originator radio 102. In some embodiments, the measurement duration time, $t_p$, can be assumed to be equal for both the wireless signal 106 sent from the originator radio 102 to the transponder radio 104 and a wireless return signal 108 sent from the transponder radio 104 to the originator radio 102.

Substituting equations (18) and (19) into equation (17) yields $$\varphi_T + \varphi_0 = -2\pi(f_O + f_T)t_x + 2\pi f_O(t_x + t_p + t_{tt}) - 2\pi f_T(t_x + t_p + t_{tt}) \qquad (20)$$

$$= -2\pi(f_O + f_T)t_x + 2\pi(f_O - f_T)(t_x + t_p + t_{tt}) \qquad (21)$$

$$= -4\pi f_T t_x + 2\pi(f_O - f_T)(t_x + t_{tt}) \qquad (22)$$

Because phase measurements are bounded by a range of 2π radians, the equation representing the sum of $\phi_T + \phi_O$ is ambiguous by a factor of 2π, which corresponds to the number of full wavelengths between the originator radio 102 and the transponder radio 104. Because this equation also represents the round-trip measurement between the originator radio 102 and the transponder radio 104, the phase representing the one-way distance (e.g., from the originator radio 102 to the transponder radio 104 or from the transponder radio 104 to the originator radio 102) is ambiguous by a factor of π.

Rearranging this equation to solve for the one-way transmission time, $t_x$, and substituting in a term to account for the ambiguity, yields $$t_x = -\frac{(\varphi_T + \varphi_0)}{4\pi f_T} + \frac{(f_O - f_T)}{2f_T}(t_p + t_{tt}) + \frac{N}{2f_T} \qquad (23)$$

The factor of $$\frac{N}{2f_T}$$

represents the ambiguilty factor for an unknown number of wavelengths. Because the factor of 2π represents one full wavelength, it does not change the overall measured phases, but rather scales the transmission time by an appropriate number of wavelengths to account for the measurement ambiguity.

Equation (23) can be solved for distance by multiplying by the speed of light, c, such that $$d_x = c\left[ -\frac{(\varphi_T + \varphi_O)}{4\pi f_T} + \frac{(f_O - f_T)}{2f_T}(t_p + t_{tt}) + \frac{N}{2f_T} \right] \quad (24)$$

Substituting the relationship between the speed of light, frequency, and wavelength yields $$d_x = \lambda_T \left[ -\frac{(\varphi_T + \varphi_O)}{4\pi} + \frac{(f_O - f_T)}{2}(t_p + t_{tt}) + \frac{N}{2} \right] \quad (25)$$

$$= \lambda_T \left[ -\frac{(\varphi_T + \varphi_O)}{4\pi} + \frac{(f_O - f_T)}{2}(t_p + t_{tt}) \right] + N\frac{\lambda_T}{2} \quad (26)$$

where $\lambda_T$ describes the carrier wavelength of the transponder radio 104. Although equations (25) and (26) have substituted the transponder wavelength and frequency for the speed of light, it is contemplated that the originator wavelength and frequency could also be used in this substitution instead. Similarly, where the other equations described herein are solved in terms of the transponder radio's values (e.g., wavelength or frequency), it is contemplated that the solutions could also be solved in terms of the originator radio's corresponding values.

This distance, $d_x$, represents the distance between the originator radio 102 and the transponder radio 104. When the distance measurement is based on a measurement of the carrier phases at the originator radio 102 and the transponder radio 104 (e.g., $\phi_O$ and $\phi_T$), this distance will be referred to as a "carrier phase range" or "CPR" for a round-trip measurement. Thus, the CPR represents the distance between the originator radio 102 and the transponder radio 104 in terms of fractional wavelengths, plus an unknown number of half wavelengths. According to some embodiments, a CPR measurement may not include a wavelength ambiguity factor, in which case it represents a relative distance or incremental distance between the radios.

The variables used to determine CPR may be either known or measured quantities. For example, the transponder radio 104 frequency, $f_T$, may be known within an acceptable range, such as a within a few parts per million (ppm), based on the parameters of the selected radio. The frequency offset, $f_O - f_T$, can be a measured value as described below. The carrier phases, $\phi_O$ and $\phi_T$, can be measured quantities, such as the carrier phase at a specific position of a transmitted signal, for example, a synchronization word or frame in a data packet.

According to some embodiments, the frequency offset, $f_O - f_T$, may be negligible. For example, the frequency offset may be approximately zero, the originator frequency and transponder frequency may be approximately equal, or the frequency offset may have been taken into account in the system design. If the frequency offset is negligible or otherwise taken into account, the CPR distance equations can be simplified to $$t_x = -\frac{(\varphi_T + \varphi_O)}{4\pi f} = \frac{-1}{2\pi f} \cdot \frac{\varphi_T + \varphi_O}{2} \quad (27)$$

and $$d_x = c\left( -\frac{(\varphi_T + \varphi_O)}{4\pi f} \right) = \frac{-\lambda}{2\pi} \cdot \frac{\varphi_T + \varphi_O}{2} \quad (28)$$

In these simplified frequency, f, represents a frequency approximately equal to $f_O$ and $f_T$. The wavelength, λ, represents the wavelength of the frequency f, and is approximately equal to $\lambda_O$ and $\lambda_T$. Each of equations (27) and (28) are ambiguous by an integer number of half wavelengths, which may be accounted for by adding a wavelength ambiguity factor $$\left( \text{e.g.}, \frac{N}{2}, \frac{N}{2f}, \text{ or } \frac{N\lambda}{2} \right),$$

as described above.

According to some embodiments, the carrier phases, $\phi_O$ and $\phi_T$, can be measured by calculating the instantaneous phase of the received IQ constellation corresponding to the received signal with respect to the LO phase of the receiving radio, such transponder radio 104. For example, according to some embodiments, the carrier phases may be measured by calculating the value of the arctangent of the quadrature channel over the in-phase channel, $$\arctan\left(\frac{q}{i}\right),$$

at a predetermined part of the received signal at each of the originator radio 102 and the transponder radio 104. For example, the predetermined part may be the start of a synchronization word or frame. According to some embodiments, the carrier phases may be measured by calculating the arctangent of the in-phase channel over the quadrature channel, $$\arctan\left(\frac{i}{q}\right),$$

at a predetermined part of the received signal at each of the originator radio 102 and the transponder radio 104. According to some embodiments, the carrier phase may be determined from a carrier recovery system or other heuristic phase error detection method, which are techniques known to one of skill in the art.

The duration time, $t_p$, may be known by system design (for example, the amount of time between the start of a transmitted signal and the predefined position, such as a synchronization word or frame).

The turn-around time, $t_{tt}$, can be a measured quantity. According to some embodiments, the turn-around time can be measured, for example, by starting a clock in the transponder device at a predefined position in the received signal 106, such as the synchronization word or frame, and stopping the clock at the same predefined position in the transmitted return signal 108 from the transponder device. The turn-around time may optionally be added to a data payload of the return signal 108 from the transponder radio 104 to the originator radio 102.

According to some embodiments, the clock used to determine the turn-around time may be a continuous clock. For example, at a predetermined part of the received signal 106, a first time stamp corresponding to the clock can be provided. A second time stamp can be provided using the clock at the same predetermined part for the return signal 108 transmitted from the transponder radio 104 to the originator radio 102. The turn-around time can be the difference between these two time stamps. The time stamps, a difference between the time stamps, or both, can be added to a data packet of the return signal 108, according to some embodiments.

According to some embodiments, the transponder wavelength, $\lambda_T$, can be approximated using the nominal wavelength of the transponder. Similarly, the originator wavelength, $\lambda_O$, can be approximated using the nominal wavelength of the originator.

If the two radios are operating at exactly the same frequency (i.e., $f_O=f_T$), then adding the two phase terms may effectively mitigate or negate the impact of the unknown phase offset between the radios. Where the two radios do not operate at exactly the same frequency, however, the phase relationship between the two radios will drift apart during the measurement. The frequency offset term, $f_O-f_T$, mitigates this drift and scales with the frequency offset, $t_p$, as well as $t_{ta}$. For some applications, it can be assumed that $f_O$ and $f_T$ operate at their nominal frequencies, and are, therefore, equal. For other applications, however, differences between the carrier frequencies may introduce significant error in the measurements.

Differences in the carrier frequencies observed at the transponder radio 104 and originator radio 102 may be due to several phenomena. For example, the frequency difference may be the result of differences between the carrier frequencies of the originator radio 102 and the transponder radio 104, as described above. The difference may also be due to the relative motion between the radios, resulting in a Doppler shift of the observed carrier frequency of each signal, 106 and 108. For example, if the transponder radio 104 is moving away from the originator radio 102, the carrier frequency of the signals 106 and 108 will appear to be slightly lower than the actual frequency of the LO in the device transmitting the signal. When there is no difference between the actual frequencies (i.e., $f_O=f_T$), any observed frequency difference will be due to the Doppler shifts resulting from the relative motion between the radios. Similarly, where the radios are known to have no relative motion (e.g., they are separated by a fixed distance), the frequency differences will be known to be differences between the carrier frequencies.

Carrier phase measurements typically have a measurement domain of a full wavelength, or $2\pi$ radians, on each leg of a round-trip measurement. Some CPR measurements may have a measurement domain of one-half wavelength, or $\pi$ radians, when they are determined by a round-trip measurement. These measurements are said to "wrap" at a CPR measurement ambiguity, such as, for example, equal to one-half wavelength ($\lambda/2$).

According to some embodiments, carrier phase measurements may have an ambiguity one-half wavelength ($\lambda/2$) when there is a $\pi$ radian phase ambiguity in the generation of the radio's local oscillator. This may occur, for example, when the local oscillator is not continuously generated throughout the round-trip measurement, if a local oscillator "lock" is released between transmission and reception of packets in a round-trip measurement, or for other reasons. These "ambiguous" CPR measurements may wrap every one-quarter wavelength ($\lambda/4$) when they are determined by a round-trip measurement. Other carrier phase measurement ambiguities are also contemplated, such as, for example, $\lambda/4$, $\lambda/8$, or other variations depending on the design of the system.

CPR data can be unwrapped to produce a continuous measurement of CPR. According to some embodiments, the CPR measurement ambiguity value can be added to adjacent CPR points when adjacent points wrap from a positive value to a negative value and by subtracting the CPR measurement ambiguity value when adjacent points wrap from a negative value to a positive value. According to some embodiments, the wrapping may occur at $\pm\lambda/4$, and a value of $\lambda/2$ can be added or subtracted to unwrap the CPR data.

Figure 2A:
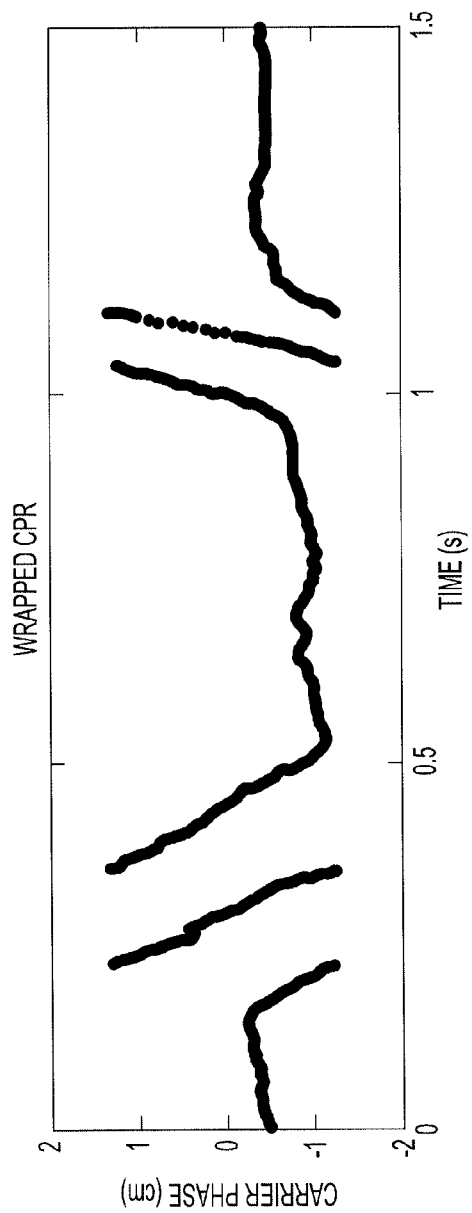
FIGS. 2A and 2B show exemplary wrapped and unwrapped carrier phase range measurements.
Figure 2B:
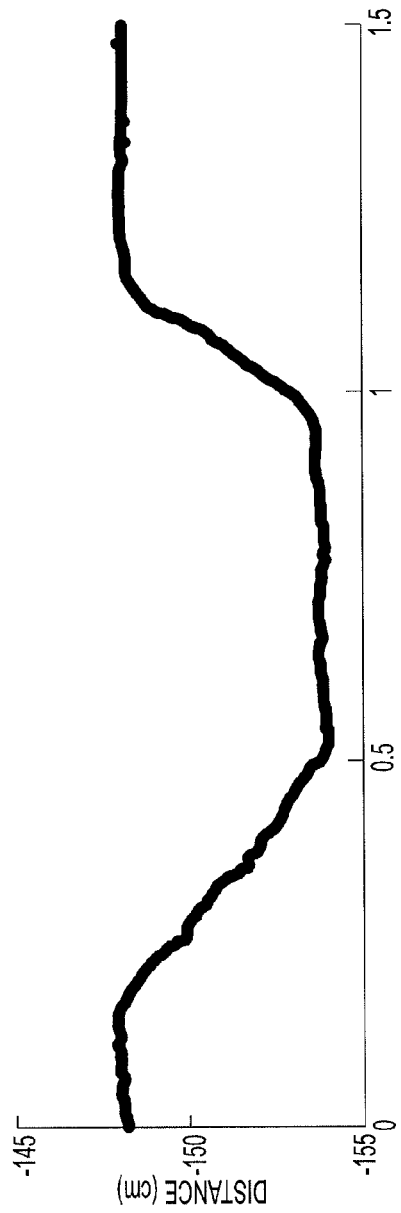

FIGS. 2A and 2B show exemplary wrapped and unwrapped CPR data, respectively. The data in FIGS. 2A and 2B was measured using radios having a nominal carrier frequency of 5.8 GHz, and a corresponding wavelength of about 5.2 cm. As shown in FIGS. 2A and 2B, the CPR data wraps every $\lambda/2$, or about every 2.6 cm. The continuous unwrapped CPR data shown in FIG. 2B was produced by adding or subtracting $\lambda/2$ depending on whether the CPR data crossed from a positive value to a negative value, or vice versa. The total unwrapped CPR distance shown on the y-axis of FIG. 2B results from the continuous unwrapping of CPR over 1.5 seconds of measurement time.

When unwrapping CPR, the initial separation distance between the originator radio 102 and the transponder radio 104 can be known or measured, and each CPR distance can be added to the initial separation distance to produce continuous CPR data representing the separation distance of the radios.

The frequency offset and the relative motion between the radios may be determined as described below.

Carrier Phase Velocity (CPV) and Frequency Offset ($f_{off}$)

Measurements of carrier phase can also be used to determine the relative motion between the originator radio 102 and the transponder radio 104. This relative motion represents the rate of change of the distance between the radios. This motion can also be determined using the carrier phase measured at the radios, and is referred to as a carrier phase velocity, or CPV.

According to some embodiments, the relative motion between the originator radio 102 and the transponder radio 104 can be determined using the slope of the carrier phase at each of the radios. For example, in addition to determining the carrier phase at a predetermined part, such as a synchronization word or frame, each radio may also sample and record the carrier phase over other parts of the transmitted signal, such as a preamble that precedes the synchronization word or frame of a data packet.

Each radio may record the sampled carrier phase over time to determine a carrier phase slope at both the originator radio 102 and the transponder radio 104. The carrier phase slope at the originator radio 102 and transponder radio 104 can be denoted as $S_O$ and $S_T$, respectively. The slope can be represented as a number of samples in the preamble of a signal, such as a data packet, which is then converted to the phase of the carrier signal over time, such as, for example, by knowing the sampling rate of the preamble. For two radios with exactly the same carrier frequency (i.e., $f_O=f_T$)

and that are not in relative motion with one another, the slopes should be zero. A positive or negative slope can be introduced by either relative motion between the radios, differences in the carrier frequencies between the radios, or both.

Figure 3:
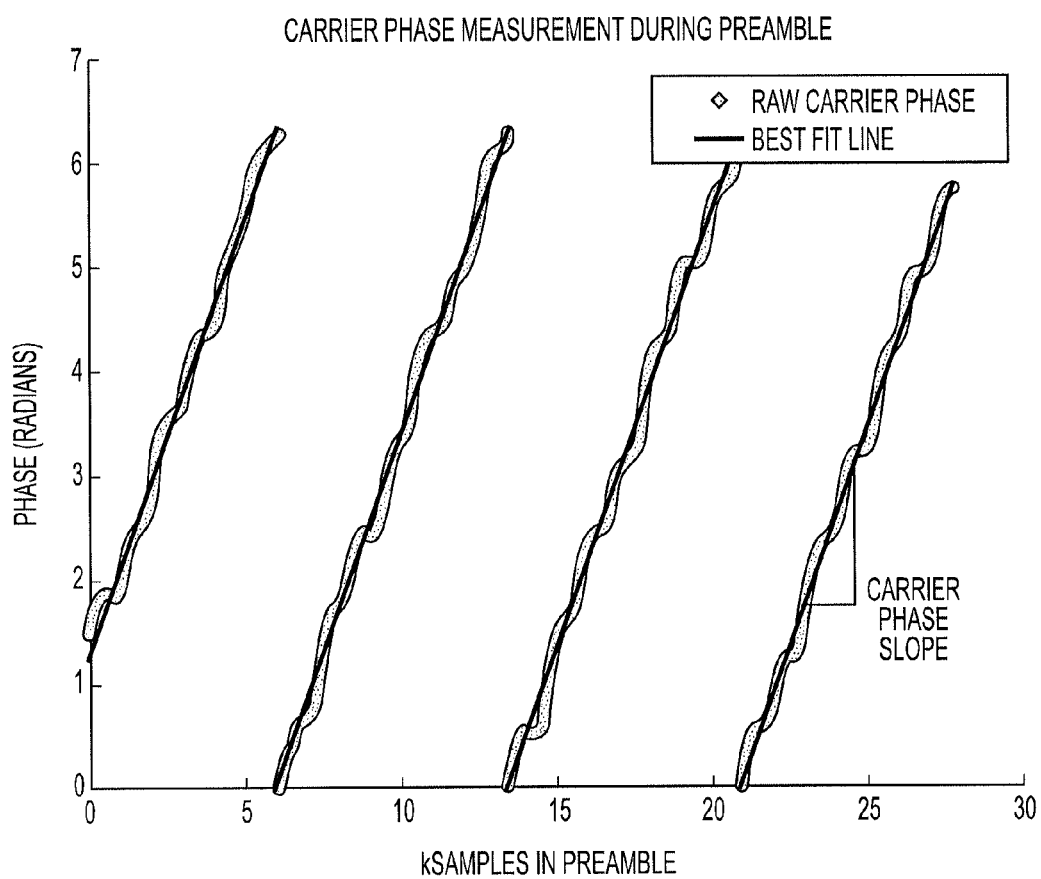
FIG. 3 shows an exemplary carrier phase slope measurement produced by sampling a data packet.

FIG. 3 shows a plot of the phase of an exemplary received carrier signal preamble. A best fit line is fitted to the carrier phase samples, representing the carrier phase slope. The plot in FIG. 3 can be converted to a plot of carrier phase versus time using the baseband sampling rate of receiving radio device. The slope of the carrier phase in FIG. 3 may represent a combination of the relative motion and the frequency variation, and can be used to determine one or both of these parameters to better estimate a position of the devices containing the radios.

The carrier phase slope at each of the originator radio 102 and the transponder radio 104 can be represented as a combination of the relative motion between the two radios and the corresponding Doppler shift in frequency, and a frequency offset, such that $$S_O = \frac{v}{\lambda_T} + f_{off} = \frac{f_T v}{c} + f_{off} \quad (29)$$

and $$S_T = \frac{v}{\lambda_O} - f_{off} = \frac{f_O v}{c} - f_{off} \quad (30)$$

where $S_O$ describes the carrier phase slope at the originator radio 102, $S_T$ describes the carrier phase slope at the transponder radio 104, v described the scalar velocity between the originator radio 102 and the transponder radio 104, $\lambda_T$ describes the wavelength of the carrier signal transmitted by the transponder device, $\lambda_O$ describes the wavelength of the carrier signal transmitted by the originator device, and $f_{off}$ describes the frequency offset $f_O-f_T$ of the carrier frequencies of the originator radio 102 and the transponder radio 104.

Adding these two prior equations together cancels to frequency offset term, yielding $$S_O + S_T = \frac{f_T \cdot v}{c} + \frac{f_O \cdot v}{c} = \frac{v(f_T + f_O)}{c} \quad (31)$$

Solving this equation for the scalar velocity, v, yields $$v = \frac{c}{f_O + f_T}(S_O + S_T) = CPV \quad (32)$$

This scalar velocity, v, represents the carrier phase velocity, CPV. Thus, the relative motion of the radios can be determined from the frequencies of the originator radio 102 and the transponder radio 104, the speed of light, and the measured carrier phase slopes at each radio.

Knowing that $f_{off}=f_O-f_T$, CPV can be further represented by $$v = CPV = \frac{c}{f_O + f_T}(S_O + S_T) = \frac{c}{2f_T + f_{off}}(S_O + S_T) \quad (33)$$

For very small values of $f_{off}$, the CPV can be approximated as $$v \approx \frac{c}{2f_T}(S_O + S_T) \quad (34)$$

$$\approx \frac{\lambda_T}{2}(S_O + S_T) \quad (35)$$

because $f_{off}$ will be substantially less than $2f_T$. Therefore, although CPV can be solved directly knowing both the originator radio frequency and the transponder radio frequency, it may also be closely approximated using only the transponder radio frequency or transponder radio wavelength and the carrier phase slopes. Equations (34) and (35) could be solved by substituting the originator wavelength and frequency for the transponder wavelength and frequency, or by substituting the nominal wavelength or frequency.

The frequency offset, $f_{off}$, may also be determined by subtracting the carrier phase slopes at the originator radio 102 and the transponder radio 104 such that at relatively low velocities $$f_{off} = \frac{(S_O - S_T)}{2 + \frac{v}{c}} \approx \frac{(S_O - S_T)}{2} \quad (36)$$

because $$\frac{v}{c}$$

can be approximated as zero. Therefore, knowing the carrier phase slopes of both the originator radio 102 and the transponder radio 104 allows for a simple approximation of both the relative scalar velocity between the radios and a determination of the frequency offset.

Although this approximation of CPV and frequency offset may be sufficient for some applications, such as very low-speed applications for short periods of time where errors introduced by the v/c term do not have time to aggregate, a more accurate solution for $f_{off}$ can be determined for applications requiring higher precision to constrain errors introduced by the frequency offset. Substituting in the equation (33) for CPV into the equation for $f_{off}$ (36) yields $$f_{off} = \frac{(S_O - S_T)}{2 + \frac{(S_O + S_T)}{2f_T + f_{off}}} \quad (37)$$

Rearranging this equation yields $$\left(2f_{off} + \frac{f_{off}(S_O + S_T)}{2f_T + f_{off}}\right) = (S_O - S_T) \quad (38)$$

$$2f_{off}(2f_T + f_{off}) + f_{off}(S_O + S_T) = (2f_T + f_{off})(S_O - S_T) \quad (39)$$

$$f_{off}^2 + (2f_T + S_T)f_{off} - (S_O - S_T)f_T = 0 \quad (40)$$

This equation can be solved for $f_{off}$ as a quadratic equation in which only the positive term is real. The solution can be represented by $$f_{off} = \frac{-2f_T - S_T + \sqrt{(2f_T + S_T)^2 + 4(S_O - S_T)f_T}}{2} \quad (41)$$

The value of $f_{off}$ may then be used to directly solve for the relative motion between the two radios, CPV or v, substituting it into equation (33) above.

According to some embodiments, CPV can be determined from sequential measurements of CPR. This determination of CPV, which may also be referred to as "CPR Rate," can be either in addition to, or as an alternative to, the sampling method described above. FIG. 4A shows, for example, an excerpt of sequential measurements of CPR over a period of time using radios with a nominal carrier frequency of 5.8 GHz. In FIG. 4A, each CPR measurement represents a round-trip measurement between an originator radio 102 and a transponder radio 104. A predetermined number of CPR samples can be used to calculate a best-fit linear equation, in which the slope represents the rate of change of CPR with time, which represents the CPR Rate that is approximately equal to CPV. For example, in FIG. 4A, the five samples enclosed in box 402 were used to calculate a best-fit linear equation centered at point 408, whose slope is shown as point 404 of FIG. 4B.

To calculate the next CPV at point 406 of FIG. 4B, the CPR data in box 410 can be unwrapped and a best-fit line can be calculated to determine the slope of the unwrapped CPR data. Although FIGS. 4A and 4B are described using five CPR data points to determine a best-fit line, any number of data points can be used depending on the CPR collection, the desired time period over which the slope is being approximated, or the processing power of the system. According to some embodiments, the instantaneous CPV values in FIG. 4B may be further fitted to a best-fit line (for example, linear or curvilinear). This line can be used to determine the rate of change of CPV, for example, the relative acceleration or an average CPV over time.

For relatively low acceleration applications, a linear equation fit to the CPR data may adequately determine a value of CPV as shown in FIGS. 4A and 4B. In high-acceleration applications, a curvilinear equation may be used to more accurately determine the CPV at a given time. For example, a higher-order (e.g., second-order, third-order, or fourth-order) equation may be used to determine a best-fit curvilinear line for the points in, for example, box 402 of FIG. 4A. The slope of the higher-order line can be determined at point 408 of FIG. 4A to describe the CPV value at point 404 of FIG. 4B. As is known to one skilled in the art, several best-fit lines can be calculated for a given time period, such as the time period defined by box 402 of FIG. 4A, and the equation having the best correlation value (e.g., the best $R^2$ value) can be used to determine the CPV. In this way, changes in acceleration, such as sudden high acceleration or deceleration, may be accounted for after periods of relatively low acceleration. According to some embodiments, the slope of CPR may also indicate whether a higher order best-fit line should be used. According to some embodiments, a best-fit equation of CPR or CPV may be selected when the root-mean-square (RMS) error is less than a predetermined value, such as, for example, less than 1 mm.

One advantage of measuring CPV by sampling the phase of the transmitted signals is that the system to determine CPR, CPV, and the absolute distance in a single round-trip measurement. Determining CPV in a single round-trip measurement allows the system to determine the instantaneous relative motion between the radios without having to wait for subsequent measurements of CPR to create a best-fit line.
Carrier Phase Difference Velocity (CPD-V) and Carrier Phase Velocity Difference (CPV-D)

According to some embodiments, CPR and CPV-based methods may be used to improve the accuracy of determining a TDOA measurement of a single signal transmitted between two or more receiving radios to determine the relative motion and position between the receiving radios by measuring the phase difference of the transmitted signal at each receiving radio. The TDOA measurement can be used to determine a carrier phase difference (CPD) measurement. CPD can also be described as a differential distance between a first receiving antenna and a second receiving antenna from a transmitting device.

Figure 5A:
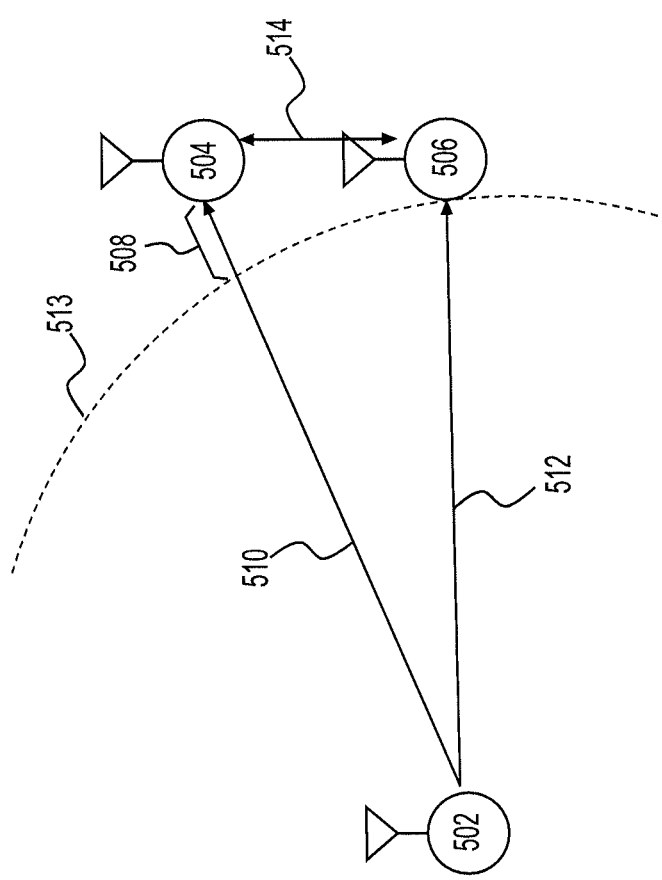
FIGS. 5A and 5B show exemplary carrier phase difference measurements.

An exemplary CPD measurement schematic is shown in FIG. 5A. CPD can be measured as a TDOA measurement, which is the difference in time a signal takes to propagate from a transmitter radio 502 to a first receiver radio 504 and the time it takes for the same signal to propagate from transmitter radio 502 to a second receiver radio 506. Line 513 represents a circle having a radius equal to distance 512 and centered at transmitter radio 502. In equation form, CPD measurement 508 of FIG. 5A can be written as $$D_{CPD} = d_{510} - d_{512} \quad (42)$$

where $D_{CPD}$ is the carrier phase difference, $d_{510}$ represents the distance 510 between the transmitter radio 502 and the first receiver radio 504, and $d_{512}$ represents the distance 512 between the transmitter radio 502 and the second receiver radio 506.

The CPD measurement can be simplified in terms of the carrier phase at each of the receiving radios. This measurement is described in U.S. patent application Ser. No. 13/746,833, filed Jan. 22, 2013, which is assigned to the same assignee as the present disclosure. A CPD measurement, in terms of carrier phase at each receiving radio, can be described as $$\arctan\left(\frac{q_1(t')}{i_1(t')}\right) - \arctan\left(\frac{q_2(t')}{i_2(t')}\right) = \varphi_1 - \varphi_2 |_{t'} \quad (43)$$

or $$\varphi_1 - \varphi_2 |_{t'} = \varphi_{510} - \varphi_{512|t'} = CPD \quad (44)$$

where $(\phi_1 - \phi_2|_{t'}$ is the carrier phase difference (CPD) between the first and second receive radios 504 and 506 at a sample time t'. The sample time t' represents a predetermined part in the transmitted signal, such as a synchronization word or frame of a data packet. $\phi_{510}$ represents the carrier phase at the sample time t' of the first receiver radio 504 and $\phi_{512}$ represents the carrier phase at the sample time t' of the second receiver radio 506. This phase difference may then be converted into a distance measurement by methods known in the art, for example, by dividing the phase change (in radians) by $2\pi$ and multiplying by the wavelength of the carrier. Therefore, CPD measurement represents the carrier phase change corresponding to the distance between the transmitter-to-first-receiver distance 510 and the transmitter-to-second-receiver distance 512 (i.e. $\phi_{510} - \phi_{512}$).

According to some embodiments, CPD may also be measured according to a difference in the carrier phase slope of each receiver radio. For example, a carrier phase slope may be measured as described in FIG. 3 by measuring the carrier phase over a number of sample points in a received signal. At a first receiver radio 504, this carrier phase slope can be denoted $S_1$, while the carrier phase slope at a second receiver radio 506 can be denoted $S_2$. The carrier phase slopes at the first receiver radio 504 and the second receiver radio 506 both measure the same received signal transmitted by the transmitter radio 502.

The best-fit line according to the carrier phase slopes, $S_1$ and $S_2$, can be used to calculate the carrier phase at a predetermined time in the received signal, t'. Similar to a CPD measurement, t' may represent the same point of the received signal, such as the start of a synchronization word or frame of the signal received at each receiver radio. The CPD may then be determined from the difference in carrier phases at the first receiver radio 504 and the second receiver radio 506 using the slope of each of the best fit lines, $S_1$ and $S_2$, at the predetermined time t'.

Figure 5B:
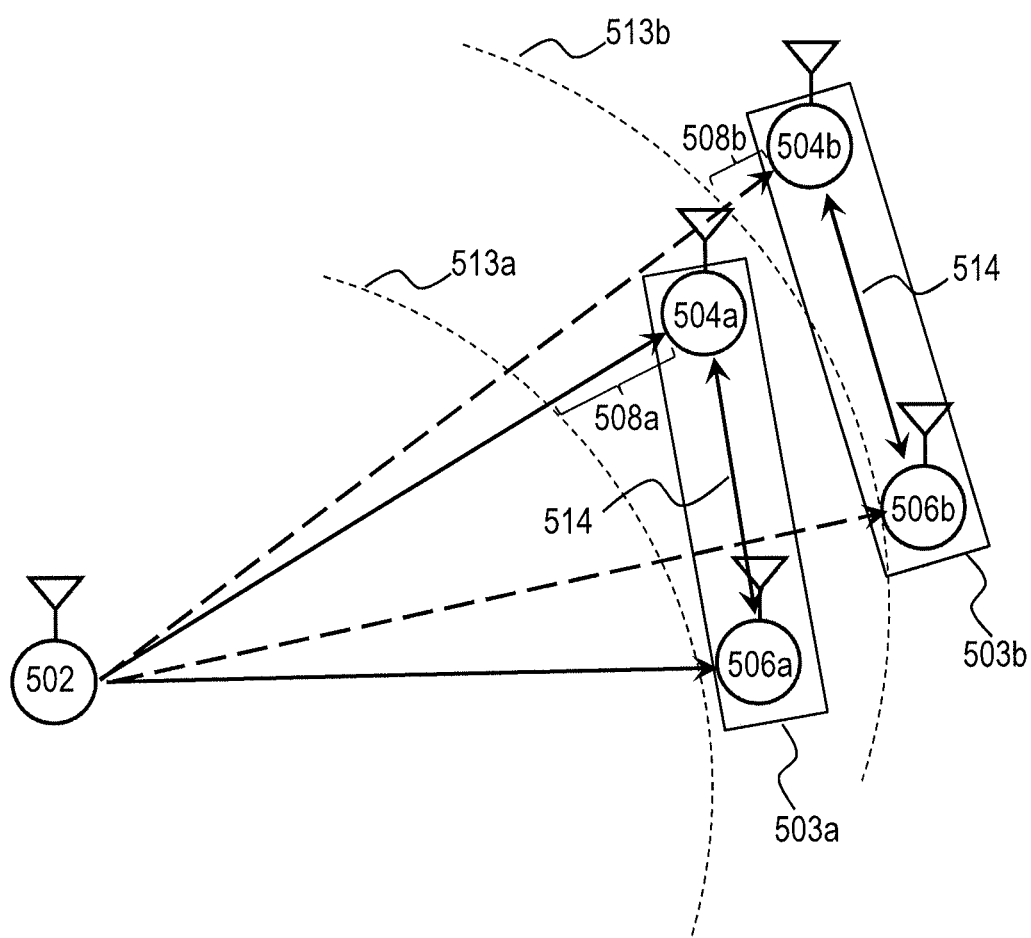

According to some embodiments, a rate of change of CPD may also be determined, as shown in FIG. 5B. For example, a difference in the carrier phase velocity rates (referred to as CPV-D) can be determined by finding the difference between the best-fit slope lines (e.g., $S_1$ and $S_2$) at the first receiver radio 504 and the second receiver radio 506. CPV-D can be used to represent the rotation of an object 503 that contains the first and second receiver radios, 504 and 506. For example, if the distance 514 between the first and second receiver radios, 504 and 506, is known, then the value of CPV-D can be used to calculate the relative rotation of the two receiver radios if the relative motion of one of the radios is known with respect to the transmitter radio 502.

The distance 514 may be a known value, for example, the receiver radios can be rigidly coupled to one another, such as by being affixed to part of a vehicle, aircraft, boot, or rigid structure.

According to some embodiments, a rate of change of CPD can be determined by measuring CPD values for more than one sample over time and fitting the measured values to a line. The rate of change of CPD values is referred to as CPD-V. For example, CPD measurements can be performed on a sample-by-sample basis, such as over a preamble up to a predetermined time period, such as a synchronization word or frame. CPD measurements may also be performed over several discrete measurements, where each CPD measurement is determined at a predetermined time period t' of each received signal. The CPD measurements, whether from sampling an individual signal or from more than one different received signal, can be fit to a line. The slope of the line represents the carrier phase difference rate, CPD-V, which, like CPV-D, can be used to represent the rotation of a body 503 containing the first and second receiver radios 504 and 506. A curvilinear equation could also be used to represent either CPV-D or CPD-V and the instantaneous slope of the curvilinear line can be used to determine rate of change of CPD at a specific time.

These two different techniques to measure the rate of change of CPD (CPV-D and CPD-V) both yield the rate of change of the differential distance from the transmitter radio 502 to the two receiver radios 504 and 506.

FIG. 5B shows one exemplary use of these techniques to determine the relative orientation change of an object 503 containing receiver radios 504 and 506. At a first time, $t_1$, receiver radios 504 and 506 may be positioned as shown by 504a and 506a, respectively. The value of $CPD_{t1}$ (item 508a) can be calculated relative to transmitter radio 502. At a second time, $t_2$, receiver radios may have moved to positions 504b and 506b, respectively. A value of $CPD_{t2}$ (item 508b) can be calculated from transmitter radio 502. If the movement of one of receiver radios 504 or 506 is known, (e.g., the relative motion of radio 506), then the relative position of the other receiver radio (e.g., 504) can be determined by calculating its new position based on the value of $CPD_{t2}$ and the known distance between receiver radios 504 and 506 as well as additional information, such as, for example, inertial measurement equations, GPS data, or tracking filters. CPD and CPD-V may be used with this additional information to update an estimate of a geometry of object 503 relative to the transmitter radio 502. Updating the geometry may generally be described as updating a relative distance, a relative orientation, or both. For example, in FIG. 5B, the relative orientation of the object 503 has rotated slightly counterclockwise from its original position, while the distance between the object 503 and the transmitter radio 502 has increased. When the geometry of object 503 is updated, such as, for example, using a tracking filter, CPD measurements 508 may be used to update the relative distance or relative orientation of the object.

CPD measurements do not require round-trip measurements. According to some embodiments, however, one or both of receiver radios 504 and 506 may also perform round-trip measurement with transmitter radio 502. A round-trip time-of-flight measurement between transmitter radio 502 and either one of receiver radios 504 or 506 can be used to calculate a distance to the other radio using CPD. If both receiver radios 504 and 506 perform round-trip time-of-flight measurements with radio 502, these measurements may help constrain CPD errors. CPD measurements may also help increase the accuracy of the range measurements. According to some embodiments, either or both of the CPD and time-of-flight measurements may be used as inputs to a tracking filter, such as, for example, a Kalman filter, to aid in solving the position change of the radios.

As shown in FIGS. 5A and 5B, receiver radios 504 and 506 may be different radios corresponding to the receiving device. It is also contemplated that radios 504 and 506 in FIGS. 5A and 5B may represent a first antenna 504 and a second antenna 506 of the same receiver radio. It is also contemplated that the receiver device may include additional radios or antennas (not shown). When more than two radios or antennas are present, CPD measurements may be calculated between different permutations of pairs of the receiver radios or antennas, such as, for example, between a first-and-second, a first-and-third, and a second-and-third pair of receiver radios or antennas.

It is also understood that an object containing transmitter radio 502 may also contain other radios (not shown). These additional radios may receive wireless signals from one or both of radios 504 and 506 and perform complementary CPD measurements at the device containing transmitter radio 502. Accordingly, the labels "transmitter" and "receiver" are used only to facilitate understanding of this description, as it is contemplated that each radio may transmit and receive wireless signals, according to some embodiments. Measuring CPD between two different objects may constrain navigational errors in personal navigation systems, such as, for example, boot-to-boot ranging systems. These measurements may also be used to assess the relative motion of objects by constraining attitude (e.g., orientation) and heading errors, for example, between multiple vehicles such as unmanned aerial vehicles or robots.

Unwrapping CPR Using CPV

When unwrapping CPR, for example, as described above, a CPR measurement ambiguity value, such as $\lambda/2$, can be added to or subtracted from a CPR value based on whether the CPR passes from positive to negative values or from negative to positive values, respectively. This determination of wrapping may be appropriate when the relative velocity between the originator and transponder radios is relatively low, such that the relative distance between the radios changes by less than the CPR measurement ambiguity between each of the CPR measurements.

According to some embodiments, CPV can be used to predict a future value of CPR or to assist in unwrapping CPR values, or both. For example, CPV may assist in resolving distance-related ambiguities when an object moves a distance greater than the wrapping limit between measurements. Unlike certain systems, such as GPS, each CPR measurement may be a discrete, independent measurement of distance. For example, in CPR measurements, there may not be a continuous tracking of the phase at the originator radio 102 and the transponder radio 104 between measurements. As a result, there may be a number of half-wavelength (or quarter-wavelength, depending on system configuration and CPR wrapping limits) ambiguities between CPR measurements. If the originator radio 102 and the transponder radio 104 are in relative motion with each other, the distance could vary by one or more half-wavelengths between measurements.

The maximum relative velocity at which sequential CPR measurements can be directly unwrapped can be described as the Nyquist velocity of the system. The Nyquist velocity can be described as one-half of the CPR measurement ambiguity (for example, one-half of a half-wavelength, or equivalently one-quarter wavelength when the measurement ambiguity is $\lambda/2$) per measurement sample interval. For example, in an embodiment having a radio operating at 5.8 GHz RF carrier frequency with a measurement rate of 366 Hz, the Nyquist velocity would be approximately 1.3 cm per 2.7 milliseconds, or about 480 cm/s. The Nyquist velocity is reduced if sequential measurements are "missed" or if the measurement rate is reduced. If the relative velocity of the two radios is greater than the Nyquist velocity, directly unwrapped CPR measurements will not yield an accurate CPR rate.

According to some embodiments, CPV may mitigate or alleviate this ambiguity between subsequent CPR measurements. Because CPR provides an estimate of the inter-radio velocity, a CPV value can be used to predict or estimate a subsequent CPR value, using a first CPR measurement and a corresponding CPV.

Knowing a first CPR value, $CPR_{k-1}$, and a corresponding CPV value, $CPV_{k-1}$, an estimated subsequent value of CPR, $CPR'_k$, can be predicted over a given period of time, dt, by the equation $$CPR'_k = CPR_{k-1} + CPV_{k-1} * dt \quad (45)$$

According to some embodiments, the ambiguity of the CPR measurement can be calculated using a round function, which can be used to round a result to a predetermined step value or order of magnitude, such as, for example, a nearest integer value or a predetermined number of decimal places. A round function may also be used to round a result to the nearest value of a predetermined step size, such as, for example, half integers or half wavelengths. An exemplary round function for determining the ambiguity of the next CPR value can be described by the equation $$Amb_k = \text{round}\left(\frac{CPR'_k - CP_k}{\lambda T/2}\right) \quad (46)$$

where $CPR'_k$ describes the predicted value of the next CPR, $CP_k$ describes measurement of the CPR phases at time k, and $Amb_k$ describes the CPR measurement ambiguity function in terms of the transponder radio's wavelength, $\lambda_T$. Substituting for $CP_k$, the ambiguity function can be written as $$Amb_k = \text{round}\left(\frac{CPR'_k - \frac{\varphi_O + \varphi_T}{4\pi}}{\lambda T/2}\right) \quad (47)$$

Although the ambiguity function and other functions listed in this disclosure are resolved in terms of the transponder wavelength, it is contemplated that the originator wavelength could also be used to resolve this function.

The unwrapped CPR value, $CPR_k$, may then be determined by adding the result of the ambiguity function to the measured CPR phase values.

$$CPR_k = \frac{\varphi_O + \varphi_T}{4\pi} + Amb_k * \frac{\lambda_T}{2} \quad (48)$$

As described above, CPV can be determined in multiple ways, such as, for example, by measuring the slopes of the received signals at the originator and the transponder radios, 102 and 104, during at least part of a preamble or other predetermined period of time. CPV may also be determined by measuring the slope of a line fitted to two or more CPR measurements. According to some embodiments, a combination of these two CPV determinations can be used to predict the next value of CPR.

Figure 6A:
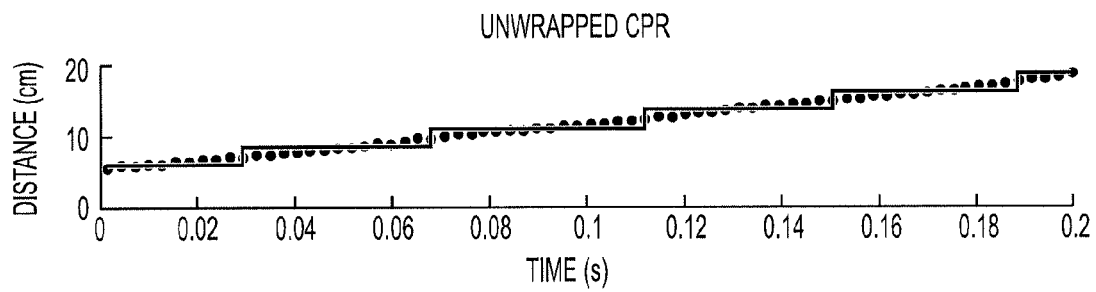
FIGS. 6A-6C show exemplary unwrapping of carrier phase range measurements using carrier phase velocity.
Figure 6B:
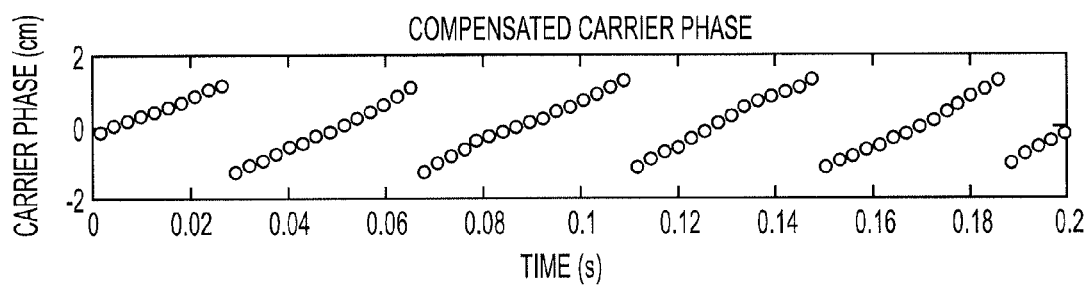
Figure 6C:
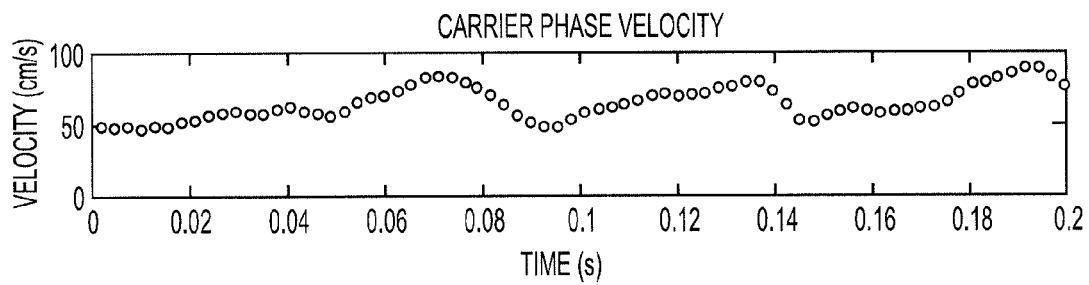

FIGS. 6A-6C show exemplary data measurements of CPR and CPV for two radios moving relative to one another. Each radio had a nominal carrier frequency of 5.8 GHz. FIG. 6A shows the velocity-unwrapped CPR projection of the distance between the two radios. FIG. 6B shows the original, wrapped CPR measurement. FIG. 6C shows the CPV velocity as determined by measuring the slopes of the carrier phases during the preamble of the received signals. As shown in FIG. 6C, the velocity between the two radios varies from about 50 cm/s to about 100 cm/s. This preamble-based measurement enables accurate and reliable unwrapping of CPR, even at high velocities. Measuring CPV by sampling the carrier phase of the incoming signal can provide an instantaneous measurement of velocity in a single round-trip time-of-flight measurement rather than determining velocity from several distinct measurements.

Figure 6D:
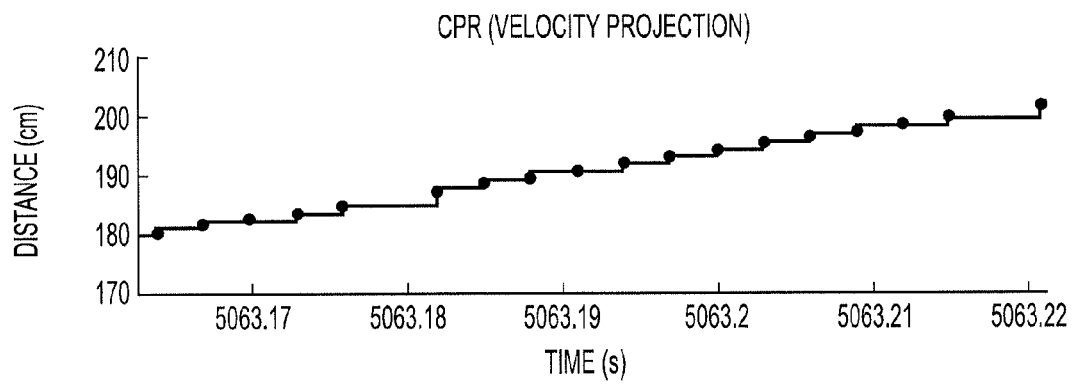
FIGS. 6D-6F show exemplary unwrapping of carrier phase range measurements using carrier phase velocity.
Figure 6E:
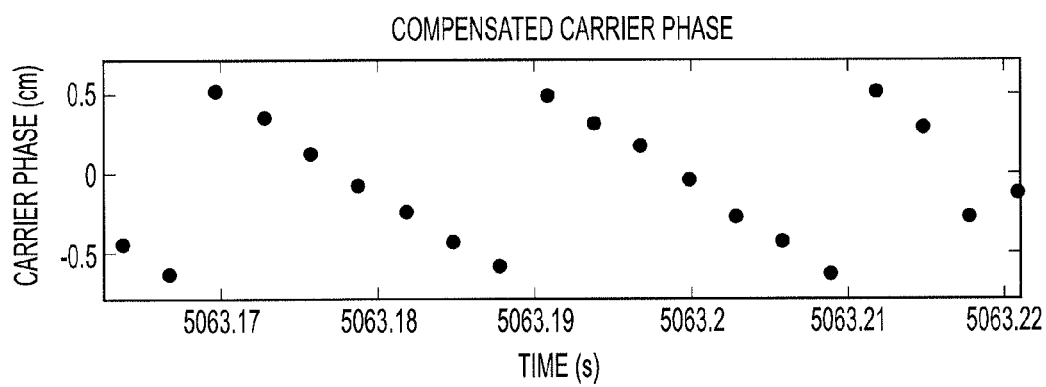
Figure 6F:
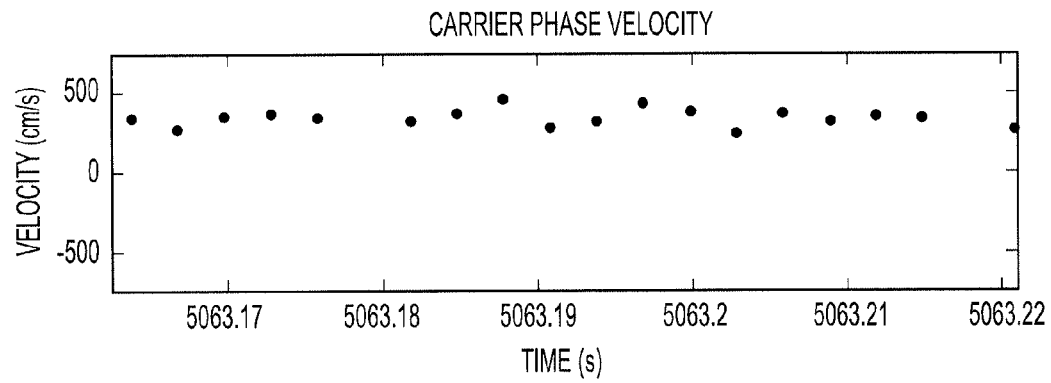

FIGS. 6D-6F show exemplary data measurements of CPR and CPV for two different radios moving relative to one another. Each radio had a nominal carrier frequency of 5.8 GHz. FIG. 6D shows the CPR projection of the distance between the two radios. FIG. 6E shows the original, wrapped CPR measurement. As shown in FIG. 6E, the rate of change of CPR appears to decrease because the slope of a best-fit line would have a negative slope. The distance between the radios, however, is actually increasing because the velocity between the radios was greater than the Nyquist velocity of the system (e.g., greater than $\lambda/4$ cm/s for these particular radios). FIG. 6F shows the CPV velocity as determined by measuring the slopes of the carrier phases during the preamble of the received signals. As shown in FIG. 6F, the velocity between the two radios varies from about 300 cm/s to about 500 cm/s. Using this preamble-based measurement of CPV, the distance between the two radios in FIGS. 6D-6F can be accurately predicted even at velocities greater than the Nyquist velocity. As shown by this example, for relatively high velocity applications, such as those greater than the Nyquist velocity, measuring CPV by sampling the carrier phase of the incoming signal may yield additional advantages, such as measuring the velocity in a single round-trip time-of-flight measurement rather than determining velocity from several distinct measurements, and also yielding an accurate determination of CPV even when the radios are being separated at a velocity greater than the Nyquist velocity.

According to some embodiments, as the CPR is unwrapped, such as shown in FIGS. 6A and 6D, a best-fit line can be calculated and the instantaneous slope of the line may be used to predict the next CPR value. Such line-fitting (either linear or curvilinear) may provide additional information, such as the relative acceleration of the objects bearing the originator and transceiver radios, in addition to the relative velocity between the radios. This additional information can be used to further aid in predicting, estimating, or constraining the values of CPV and CPR.

According to some embodiments, the values of CPR and CPV can be predicted or estimated using a tracking filter, such as a Kalman filter or particle filter. The output of the tracking filter may then be compared to a measured result. The output of the tracking filter, the comparison, or both, can then be used to update the tracking filter for the next estimate.

Unwrapping CPD Using CPV-D or CPD-V

According to some embodiments, CPD may, like CPR, be unwrapped using a relative rate of change, such as using CPV-D or CPD-V. For example, if two of the receiver radios on an object measuring CPD are separated by more than a half wavelength, a raw CPD measurement may be ambiguous because the phase of the CPD measurements may "wrap" depending on the rotation or orientation of the object containing the receiving radios.

According to some embodiments, this ambiguity can be resolved similar to the CPR solution described above. For example, knowing a first CPD value, $CPD_{k-1}$, and a corresponding CPV-D or CPD-V value, $CPVD_{k-1}$, a predicted value of the next CPD, $CPD'_k$, can be predicted over a given period of time, dt, by the equation $$CPD'_k = CPD_{k-1} + CPVD_{k-1} * dt \quad (49)$$

In the equation above, the term CPVD may represent either CPV-D or CPD-V, because these two measurements should yield the same result. The ambiguity of $CPD'_k$ can be resolved with a round function, as described above. For example, $$Amb_k = \text{round}\left(\frac{CPR'_k - \Delta CP_k}{\lambda/2}\right) \quad (50)$$

where $CPD'_k$ describes the predicted value of the next CPD at time k, $\Delta CP_k$ describes measurement of the CPD phase difference at time k, and $Amb_k$ describes half-wavelength ambiguity of the transmitted signal. Substituting for $CP_k$, the ambiguity function can be written as $$Amb_k = \text{round}\left(\frac{CPD'_k - (\theta_{510} - \theta_{512|k})}{\lambda/2}\right) \quad (51)$$

The unwrapped CPD value, $CPD_k$, may then be determined by adding the result of the ambiguity function to the measured CPD phase values.

$$CPD_k = (\theta_{510} - \theta_{512|k}) + Amb_k * \frac{\lambda}{2} \quad (52)$$

According to some embodiments, as the CPD is unwrapped, a best-fit line can be calculated and the instantaneous slope of the line may also be used to predict the next CPD value. Such line fitting (for example, linear or curvilinear) may provide additional information, such as the relative acceleration or rotational acceleration of the object bearing the receiver radios, in addition to the relative velocity or rotation between the receiver radios. This additional information may be used to further aid to predict, estimate, or constrain the values of CPD, CPD-V, or CPV-D.

According to some embodiments, the values of CPD, CPV-D, and CPD-V can be predicted or estimated using a tracking filter, such as a Kalman filter or particle filter. The output of the tracking filter may then be compared to a measured result. The output of the tracking filter, the comparison, or both, may then be used to update the tracking filter for the next estimate. For example, CPD, CPV-D, or CPD-V may be used to constrain navigational errors resulting from ranging measurements, IMU data, or other navigation sources. These measurements may also assess the relative rotation of objects relative to one another to constrain attitude (e.g., orientation) and heading errors, for example between multiple vehicles or between feet in foot-to-foot ranging applications.

Ranging Estimates

Unwrapping CPR measurements may provide a continuous estimate of the distance between two or more radios. Because of the initial wavelength ambiguity, however, unwrapping using CPR and CPV alone may be ambiguous at the first measurement. Once the initial ambiguity is resolved, subsequent values of CPR and CPV can be made relative to this initial value to track an object. For example, CPR or CPV measurement at a first time can be added to the initial ambiguity to calculate a first updated distance or position, and another CPR or CPV measurement at a second time can be added to the first updated distance or position to determine a second updated distance or position. This process may continue throughout the tracking, distancing, or locating of the objects. Because CPR and CPV can be considered relative changes and positions from previous measurements, they can be incrementally added to previous measurements to provide continuous positioning and tracking of an object after the initial distance ambiguity is resolved.

According to some embodiments, the initial distance ambiguity in which the CPR measurements first begin may be determined by an absolute measurement of the initial "offset" distance between the two radios. The offset distance can be determined using any of a number of methods. For example, according to some embodiments, if the two radios used to perform the CPR measurements are relatively close to one another, the distance may simply be measured directly by means of a measuring device, such as a ruler or laser range-finder, and stored in a memory or a tracking filter, such as a Kalman filter or particle filter. According to some embodiments, the initial offset distance may be a known or assumed value. According to some embodiments, the initial offset distance may be determined based on the global positioning coordinates of each radio. According to some embodiments, the initial distance may be assumed to be zero or negligible, for example, in applications where the initial offset distance is relatively small compared to the overall measurement, such as when the two radios start a few centimeters apart, but are expected to be separated by several miles over the course of the measurement. According to some embodiments, the "offset" distance for the CPR measurement may be determined, for example, as part of a round-trip time-of-flight measurement.

Figure 7:
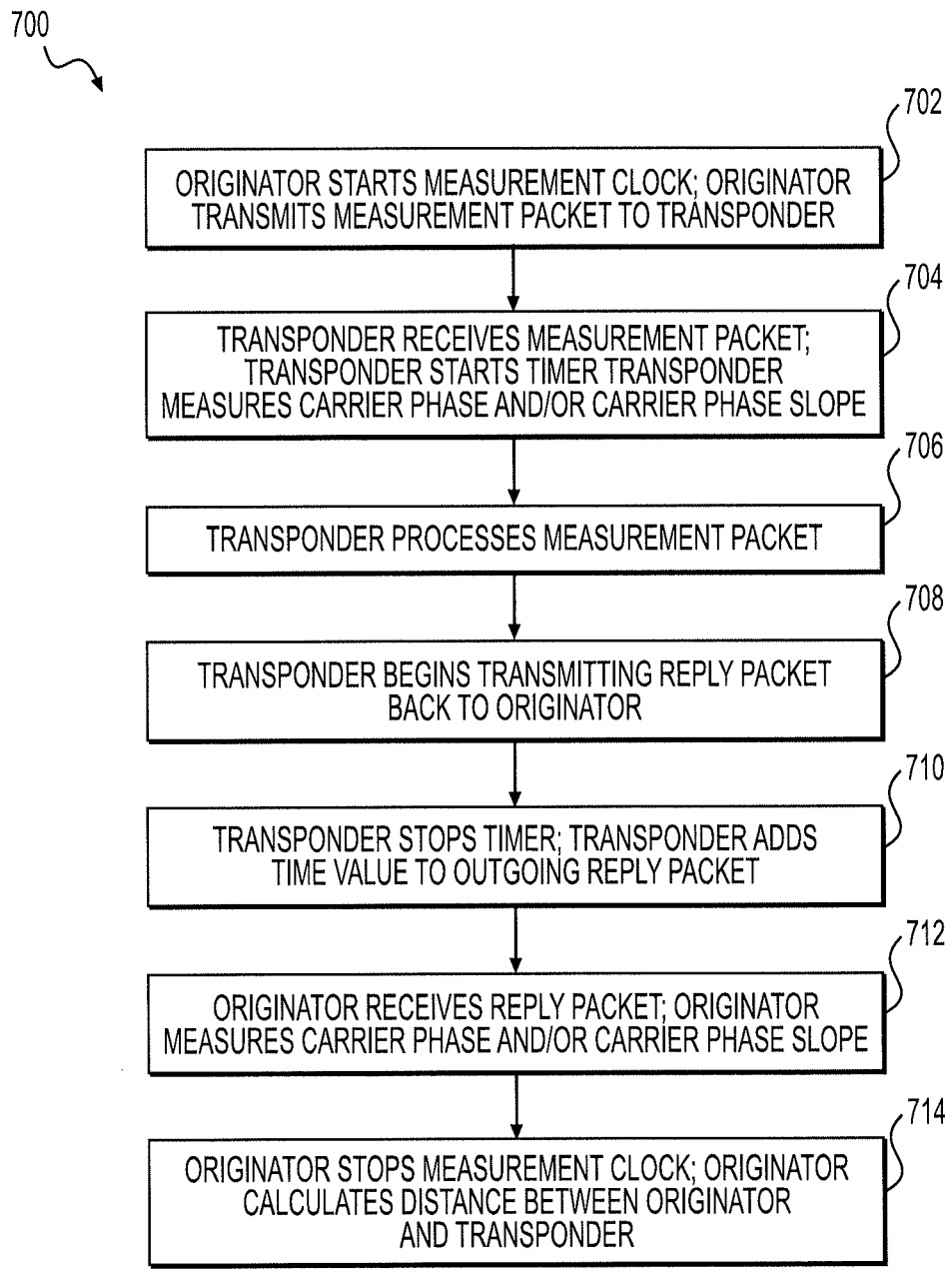
FIG. 7 shows an exemplary method for performing a round-trip time-of-flight measurement.

FIG. 7 shows an exemplary method 700 for performing a round-trip time-of-flight measurement between exemplary originator radio 102 and exemplary transponder radio 104 of FIG. 1. At step 702, originator radio 102 starts a measurement clock and transmits a signal packet as part of wireless signal 106 to transponder radio 104. According to some embodiments, the signal packet may include a preamble, a synchronization word or frame, and a data payload. Originator radio 102 may start the measurement clock upon transmission of the synchronization word.

At step 704, transponder radio 104 receives wireless signal 106. Transponder radio 104 may start an internal timer upon receipt of the signal packet in order to determine or record the amount of time for transponder radio 104 to process the signal packet. For example, transponder radio 104 may start the timer upon receipt of the synchronization word or frame in the signal packet. Transponder radio 104 may also measure the carrier phase or carrier phase slope, or both, for the received wireless signal 106, for example, during the preamble and at the synchronization word. At step 706, transponder radio 104 processes the signal packet and begins preparing a reply packet to transmit back to originator radio 102. According to some embodiments, as part of processing the signal packet, transponder radio 104 may calculate a peak error value for wireless signal 106, for example, using the measured baseband phase. Preparing the reply packet may also include, for example, determining a slope of the carrier phase, such as, for example, by sampling the carrier phase during the preamble, as described above. Preparing the reply packet may also include adding the measured carrier phase slope and a measured carrier phase at a predetermined part of the signal packet to the reply packet.

At step 708, transponder radio 104 begins transmitting the reply packet to originator radio 102 as part of wireless signal 108. At step 710, transponder radio 104 stops the timer and adds the corresponding time value to the outgoing message reply packet. For example, transponder radio 104 may stop the timer upon transmission of the synchronization word or frame in the reply packet. The elapsed time of the timer in transponder radio 104 may correspond to the time between receipt of the synchronization word as part of the signal packet and transmission of the synchronization word as part of the reply packet. This time value represents a "turn-around time" for transponder radio 104. Also at step 710, transponder radio 104 may add a turn-around time value to the outgoing reply packet. For example, transponder radio 104 may insert a value of the actual time elapsed during processing, or a clock-cycle count that represents the number of clock cycles between when transponder radio 104 began the time measurement in step 704 and stopped the time measurement in step 710, or an indication of the first and last clock cycle values from which the total number of clock cycles can be determined. According to some embodiments, transponder radio 104 may not begin a timer at step 704 and stop the clock at step 710, but may instead determine the corresponding turn-around time from a continuously running clock, such as by time stamps or clock-cycle values. Transponder radio 104 may use one or more of the measured phase values to provide a more accurate turn-around time, such as using a measured phase to determine sub-clock cycle precision for the turn-around time. According to some embodiments, transponder radio 104 also adds the measured phase to the reply packet. According to the exemplary method of FIG. 7, when transponder radio 104 begins transmitting the reply packet, the timer is still running. The timer is then stopped at transmission of the synchronization word and the value is added to the outgoing transmission, which may allow for a more accurate determination of the turn-around time.

At step 712, originator radio 102 receives wireless signal 108 and the reply packet from transponder radio 104. At step 714, originator radio 102 stops the measurement clock that it previously started in step 702, for example, upon receipt of the synchronization word of the reply packet, and uses the reply packet to calculate the round-trip time-of-flight and the distance between originator radio 102 and transponder radio 104. Originator radio 102 may also measure the carrier phase of wireless signal 108 by sampling a preamble of wireless signal 108, as described above, to determine a slope of the carrier phase. Originator radio 102 may also measure the carrier phase at a predetermined part, such as at a synchronization word, and use this phase value to determine a sub-clock cycle time value. Originator radio 102 may also calculate the round-trip time-of-flight between originator radio 102 and transponder radio 104 by subtracting the turn-around time recorded by transponder radio 104 from the total elapsed time between steps 702 and 714 indicated by the timer in originator radio 102. Originator radio 102 may calculate the distance between originator radio 102 and transponder radio 104 from this round-trip time-of-flight, for example, by multiplying by the speed of light and dividing by two.

According to some embodiments, originator radio 102 may not begin a measurement clock at step 702 and stop the clock at step 714, but may instead determine the corresponding elapsed time from a continuously-running clock, such as by time stamps or clock-cycle values. Originator radio 102 may use the elapsed time to calculate the round-trip time-or-flight or distance, as described above.

According to some embodiments, originator radio 102 and transponder radio 104 may perform a round-trip time-of-flight measurement as described in U.S. Pat. Nos. 8,199,047 and 8,314,731 (which are assigned to the same assignee as the present disclosure), the disclosures of which are hereby incorporated by reference in their entirety. It is contemplated that the methods disclosed in U.S. Pat. Nos. 8,199,047 and 8,314,731 can be used in conjunction with the method 700. Other methods of performing a round-trip time-of-flight measurement are also contemplated.

The distance between originator radio 102 and transponder radio 104 corresponds to the offset distance between the radios for CPR calculations and can be used to resolve the initial distance and wavelength ambiguity of the CPR measurement.

The slopes of the carrier phases measured by originator radio 102 and transponder radio 104 can be used to calculate corresponding values for CPR, CPV, and $f_{off}$, as described above. The values of CPR, CPV, and $f_{off}$ can be used to update an estimate of the positions of originator radio 102, the transponder radio 104, or both. For example, the value of the unwrapped CPR could be compared to the measured round-trip time-of-flight distance for each measurement. A difference between the round-trip time-of-flight measurement and the unwrapped CPR could be determined by creating a regression line for each of the CPR and round-trip time-of-flight measurements. According to some embodiments, the CPR data and round-trip time-of-flight measurements, or the difference between CPR and the round-trip time-of-flight measurement, could be used as inputs to a tracking filter, such as a Kalman filter or particle filter. The tracking filter may include other parameters, such as GPS data, inertial navigation data, digital magnetic compass (DMC) data, acceleration or accelerometer data, as additional inputs to track the location or position of an object. According to some embodiments, the tracking filter may use estimates of distance (e.g., round-trip time-of-flight or CPR, or both) and velocity (e.g., CPV) as inputs to the filter for updating the state equations of the filter. By using CPV, derived either directly from a signal or from differencing unwrapped CPR, the distance state estimate may be updated based upon the difference in the baseband range and the predicted distance based upon velocity.

Exemplary Applications and Uses

The principles, methods, and systems in this disclosure can be applied broadly to any application in which it is desired to determine a distance, velocity, location, or relative position of an object, or for tracking the movement or position of an object. Such applications may be relevant to aviation, military, industrial, or consumer environments.

According to some embodiments, the principles in this disclosure can be used to improve navigation and tracking of objects. For example, the principles can be combined with other distance-finding methods to determine the position of an object relative to a transmitting radio. CPR and CPV can be used to update the position of an object over time. For example, once the initial wavelength ambiguity is resolved, the values of CPR and CPV can be used to predict the next position of an object or to update the position of the object over time. If the carrier frequencies of the originator and transponder radios are known to be stable (e.g., do not drift over time), or may be assumed stable over the relevant time period, then round-trip measurements may not be necessary to determine subsequent values of CPV from a transmitter radio. This may increase the measurement rate and reduce measurement latency by decreasing the time it takes to perform a measurement.

According to some embodiments, CPR and CPV measurements or position predictions, or both, may be used as an input to a tracking filter, such as a Kalman filter or particle filter, to help constrain measurement or navigation errors and improve the tracking properties of the filter. The values of CPR, CPV, and estimated positions using CPR and CPV can be used to track the location of an object, for example, in the absence of GPS.

According to some embodiments, a system or device may use CPR, CPV, CPD, CPV-D, or CPD-V measurements as part of an inertial navigation system or device. Inertial navigation systems may include one or more inertial measurement units (IMU). Inertial navigation systems may perform a sensor-based tracking, such as in the absence of GPS signals, by using data from an IMU separately or in combination with a digital magnetic compass (DMC). IMUs typically include three mutually orthogonal linear accelerometers and three mutually orthogonal rate gyroscopes to collect time-series data of linear accelerations and angular rates in the reference frame of the IMU. Generally the three accelerations are measured by accelerometers and the angular rates are measured by gyroscopes. These six values fully characterize the dynamics of the IMU. DMCs provide three measurements of the strength of the measured magnetic field relative to the same fixed orthogonal axes used to calculate linear acceleration. In the absence of magnetic disturbances, the direction of the measured magnetic field vector gives an estimate of the "magnetic heading."

Data from an IMU or DMC can be combined with CPR, CPV, CPD, CPD-V, or CPV-D, or any combination thereof, measurements to track the position or course of the inertial measurement system. An exemplary inertial measurement system is described in U.S. patent application Ser. No. 13/746,833, filed Jan. 22, 2013, and assigned to the same assignee as the this disclosure. Inertial navigation systems may include, for example, boot-to-boot ranging systems, but also generally include any system that uses IMU data as part of a tracking or navigation function. The principles and methods disclosed herein may further improve the accuracy of an inertial navigation system. For example, CPR, CPV, CPD, CPD-V, or CPV-D, or any combination thereof, may be used as one or more inputs to a tracking filter to update a state matrix of the tracking filter. Similarly the predicted positions using one or more of CPR, CPV, CPD, CPD-V, or CPV-D, or any combination thereof, may be used as an input to a tracking filter, which may also include, for example, IMU, DMC, range data, or GPS data to further improve tracking capabilities. Accordingly, these parameters can be used to track the position of an object over time.

Inertial navigation systems may also include objects such as air, ground, space, undersea, and surface vehicles, which may be manned, unmanned, or autonomous, which include one or more IMU. The principles and methods in this disclosure can be applied to assist these inertial navigation systems track the position or location of the object even in the absence of GPS, such as, for example, in buildings, underground, in caves, in canyons, or underwater, or when GPS is denied or degraded due to unintentional or intentional jamming or interference.

According to some embodiments, the principles in this disclosure can be used to determining the relative location or movement of an object within a group, for example, between personnel such as first-responders or military personnel using radios attached to each of the personnel or between aircraft flying in formation.

According to some embodiments, the principles in this disclosure can be used for consumer applications, for example, assisted GPS location and ranging applications to determine a position of an object, such as a cellular telephone or a person carrying a cellular telephone. Such ranging and location may be useful in emergency or search and rescue operations, such as E911 location; coordinates for search and rescue personnel; and child, pet, or geriatric tracking or location.

According to some embodiments, the principles in this disclosure may be used for industrial applications. Such applications may include collision avoidance or signaling for railroads or mining operations. Ranging and tracking may also be used for automation of operations or machines, such as self-location of equipment in mines or mobile robotics position, navigation, and timing (PNT). Other industrial applications may include workflow automation of manufacturing processes, or tracking and locating objects used in ground operations at airports or other high-traffic facilities.

According to some embodiments, the principles in this disclosure can be used for military or aviation applications. Such applications may include guidance or tracking of missiles, personnel, aircraft, tanks, trucks, or other vehicles. The principles in this disclosure may also be integrated into a pedestrian navigation system, such as, for example, a component in boot-to-boot ranging in a personal navigation system, between a soldier and a base object such as a camp or central radio system, soldier-to-solder location or tracking, or between multiple "swarm" objected such as UAVs or missiles. The disclosed principles may also be used to facilitate GPS fixation when a GPS signal becomes available or to improve the time to subsequent position fixation after loss of a GPS signal.

Although the exemplary embodiments in this disclosure may be discussed with respect to an originator radio and a transponder radio, it is understood that the radios may be incorporated into larger objects or devices, such as vehicles, aircraft, backpacks, guidance systems, and articles of clothing or footwear. Similarly, any data processing or method steps described as being performed by the radios may be performed by one or more processors that are incorporated into the object containing the radios or as part of a separate object that receives data from the radios or objects containing the radios for processing.

Although the exemplary embodiments may be described with respect to a single originator radio and a single transponder radio, it is understood that this represents a simplified description used to facilitate understanding of the principles and methods in this disclosure. According to some embodiments, an originator radio may perform CPR, CPV, CPD, CPD-V, or CPV-D, or any combination thereof, with a plurality of transponder radios. Similarly, a plurality of originator radios may perform CPR, CPV, CPD, CPD-V, or CPV-D, or any combination thereof, with a single transponder radio or a plurality of transponder radios. The plurality of originator radios may be located on a single object or may be located on a plurality of objects and the plurality of transceiver radios may be located on a single object or a plurality of objects.

Furthermore, although CPD, CPD-V, and CPV-D measurements are described between a single transmitter radio and two receiver radios, it is understood that the receiving object may include more than two receiver radios and that more than one originator radio may perform CPD-related measurements with the receiver radios. The plurality of originator radios may be located on the same object or may be located on different objects, depending on the application or requirements of the system. Similarly, it is also understood that one of the receiving radios may transmit a signal to a plurality of radios on the transmitter object to perform a second CPD measurement. Performing CPD measurements between two objects, such as during both parts of a round-trip measurement, may be useful in many applications, such as, for example, foot-to-foot ranging or tracking of multiple objects, such as in a "swarm" of robots or vehicles, where the CPD (and CPV-D or CPD-V) calculated at each object provides information about the relative attitude or heading of each object.

EXAMPLES

Figure 8:
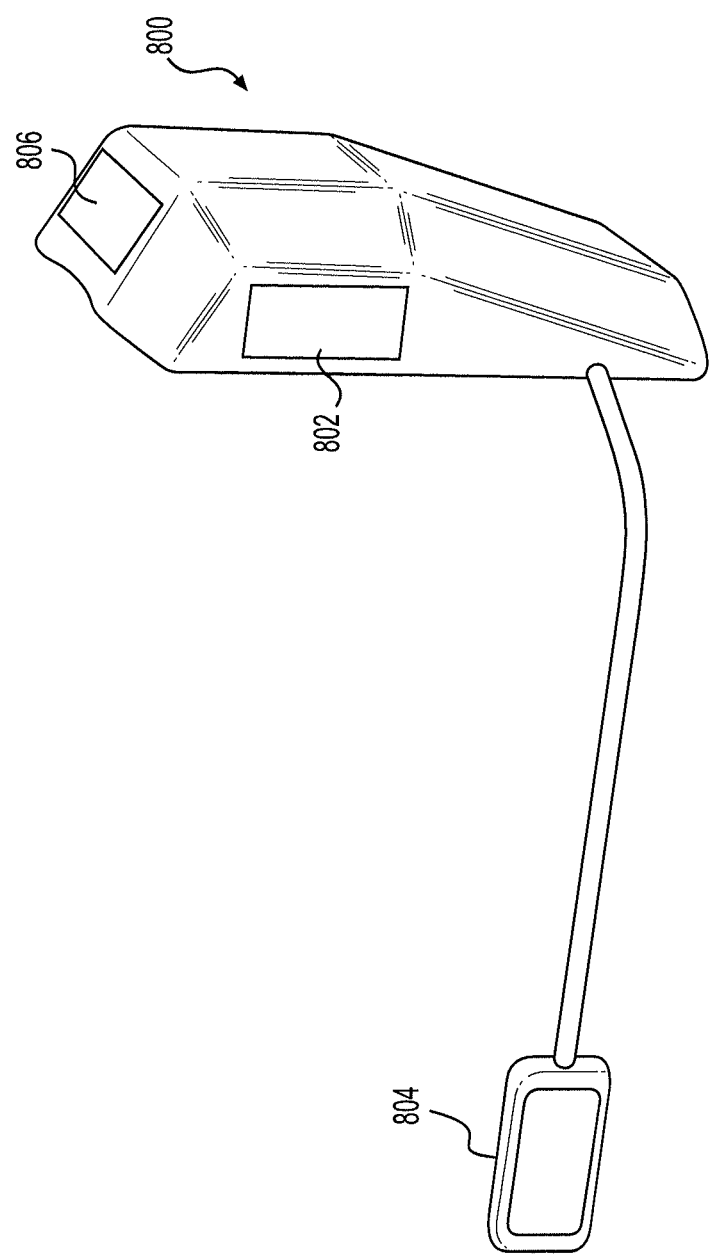
FIG. 8 shows an exemplary device for performing some of the measurements of this disclosure.

A pedestrian navigation system was constructed having boot-mounted radios. FIG. 8 shows an exemplary device 800 mounted on each boot. Device 800 includes two radios 802 and 804, and a GPS antenna 806. Each device 800 mounted to each boot also includes a processor (not shown), a GPS receiver (not shown), and an inertial measurement unit (IMU) (not shown). Each of the radios 802 and 804 were circularly polarized radios configured to transmit and receive wireless signals with corresponding radios 802 and 804 on the other boot of the system. The carrier frequencies were nominally 5.8 GHz. The exemplary pedestrian navigation system was used to perform several tests for determining the distance between each of the boots.

FIGS. 9A and 9B show the results of a slow walking test in which a user wearing the boot-mounted navigation system walked for several steps. During the test, CPR data was gathered by the methods described above. In addition, baseband range measurements were performed using a round-trip time-of-flight method between the left and right boots.

FIG. 9A shows a plot of the wrapped CPR distance over time. As shown in FIG. 9A, the CPR data wraps frequently because the wrapping occurs every half-wavelength (approximately 2.6 cm), although some distinct peaks corresponding to the maximum stride length can be observed.

FIG. 9B shows a comparison of the quality of CPV-aided unwrapped CPR data against the raw baseband ranging data collected in the same round-trip measurement used to determine the CPR ranges. As shown in FIG. 9B, the unwrapped CPR data provides a smooth estimate of the distance between the two devices whereas a baseband ranging measurement may be prone to meter-level ranging errors. It is believed that the ranging errors in the baseband distance may be due to multipath interference resulting from reflections of the signals between the originator radio and the transponder radio in each round-trip measurement.

Figure 10A:
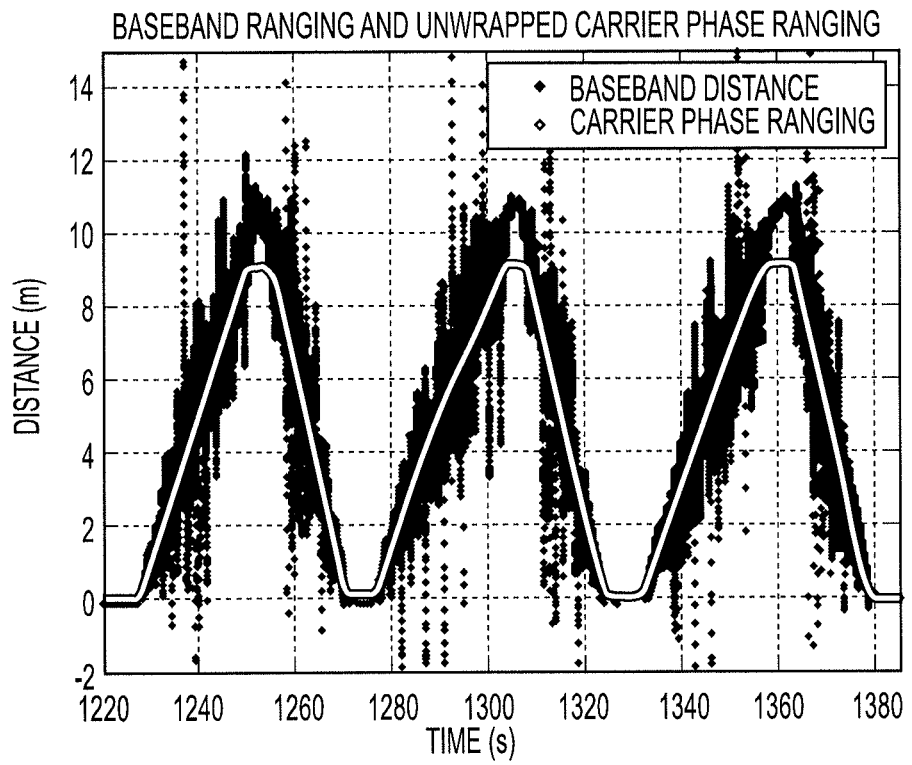
FIGS. 10A and 10B show an exemplary comparison of carrier phase range data and baseband range data.
Figure 10B:
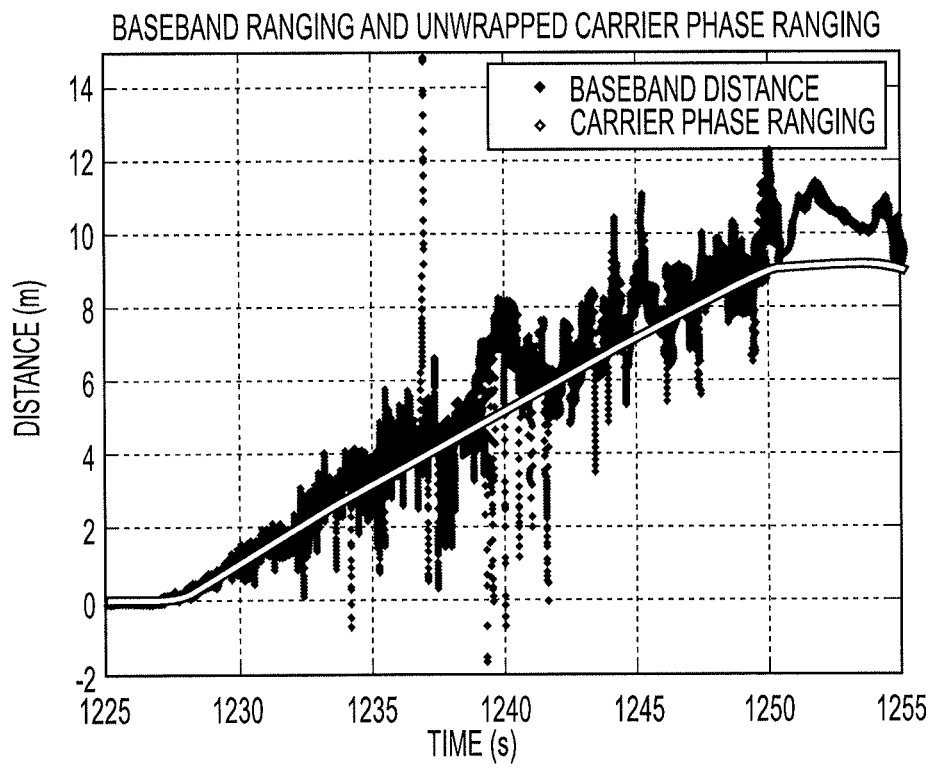

FIGS. 10A and 10B show the results of a test for determining the robustness of the CPR and CPV-based ranging in a high-multipath environment. One boot was placed stationary on a sidewalk while the other boot was moved away from the stationary boot for a distance of about 9-10 m then back to the stationary boot. This process was repeated three times, as shown in FIG. 10A. During this test, the distance between the originator boot and the transponder boot were determined using both CPR and baseband ranging using round-trip time-of-flight measurements, the results of which are shown in FIGS. 10A and 10B. The CPV for each of the CPR measurements was determined using a five-point best-fit line fitted to the CPR values. FIG. 10B shows a magnified view of the time period between 1225 and 1255 seconds of FIG. 10A.

As shown in FIGS. 10A and 10B, in high-multipath environments, baseband ranging may be prone to significant distance errors, for example, resulting from the multipath interference signals reflecting from the floors, walls, or ceiling of the hallway. The effects of the multipath interference signals are shown by the very large deviation in the ranging measurements, such as at about 1237 seconds, 1283 seconds, and 1290 seconds. The ranging errors resulting from this multipath interference leads to significant errors in tracking position and location over time. The CPR-based ranging, however, provides a more precise determination of the distance between the radios even when the baseband measurement may result in as much as a 10 m error in distance (e.g., at about 1237 seconds). By using, for example, CPV to help constrain the relative distance measured by CPR or baseband ranging, the overall error of long term measurements can be mitigated and accuracy can be improved.

Although the measurements in FIGS. 10A and 10B were performed by measuring the distance between the boot-mounted systems shown in FIG. 8, it is understood that this test is representative of any two radios in relative motion to one another and that the exemplary boot-mounted systems were used merely for convenience to facilitate the general test. The systems used to collect data for FIGS. 10A and 10B are understood to be proxies for any originator radio and transponder radio, such as, for example, radios mounted on aircraft or vehicles, in cellular telephone or towers, on robots, on UAVs, on industrial machinery, or mounted to any other object for which distance, position, or tracking information is desired.

Figure 11:
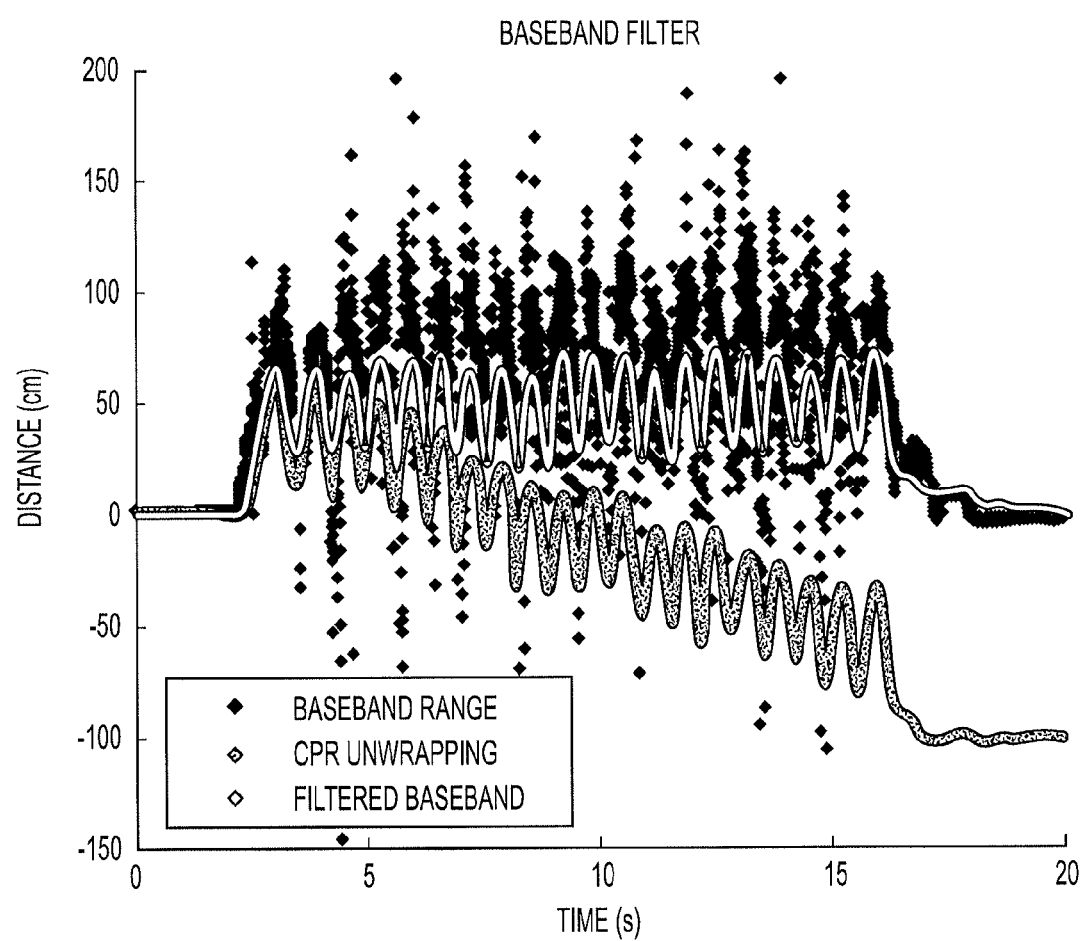
FIG. 11 shows a comparison of baseband range data, unwrapped carrier phase range data, and filtered baseband data using carrier phase velocity.

FIG. 11 shows the results of a fast walk over the course of about 20 seconds. As shown in FIG. 11, the raw baseband ranging data exhibits significant errors in distance. The unwrapped CPR data alone may drift over time, for example, but not converging back at zero at the end of the test. When the baseband data was filtered using CPR and CPV data, however, it retained the precision of the CPR distance data and properly converges back to zero at the end of the test. Thus, even for rapid movements, CPR and CPV data improves the accuracy and precision of position location and tracking.

Accordingly, as shown in FIGS. 9A, 9B, 10A, 10B, and 11, using CPR and CPV data helps constrain navigation errors that may be introduced during a series of ranging measurements. Accordingly the measurements in this disclosure further improve tracking and locating of objects. The methods and principles in this disclosure also improve tracking of objects in the absence of GPS or in high-multipath environments.

Further in accordance with the present disclosure, a non-transitory computer-readable storage medium may contain instructions to configure a processor to perform, or to instruct a radio or device to perform, one or more of the previously described processes and methods. The computer readable medium may also be used as part of the previously described systems. For example, the computer-readable storage medium may contain the software or instructions that, when executed by one or more processors, act as a processor to control an originator device or transponder device.

The foregoing description has been presented for purposes of illustration. It is not intended to be exhaustive and does not limit the invention to the precise forms or embodiments disclosed. Modifications and adaptations of the principles of this disclosure will be apparent to those skilled in the art from consideration of the specification and practice of the disclosed embodiments. Additionally, although aspects of the disclosure are described as being stored in memory, one skilled in the art will appreciate that these aspects can also be stored on other types of computer-readable media, such as secondary storage devices, including but not limited to, hard disks, floppy disks, solid-state storage, optical storage (e.g., CD, DVD, BD), magnetic storage, the Internet or other propagation medium, or other forms of RAM or ROM. Similarly, although certain aspects are described as being performed on a processor, one skilled in the art would understand that a processor may take many forms, including but not limited to, field-programmable gate arrays (FPGAs), microprocessors, application-specific integrated circuits (ASICs), integrated circuits (ICs), microprocessors, system on chip (SoC) devices, general purpose processors executing instructions stored in memory, and other processing units. A processor or processing device may include single- or multi-core processing devices. A processor may include one or more distinct processing units, for example, it may include two or more microprocessors in which steps of the methods described herein are distributed between the microprocessors such that the microprocessors act together to perform the functions of a single processor unit.

Computer programs based on the written description and methods of this disclosure are within the skill of an experienced developer. The various programs or program modules can be created using any of the techniques known to one skilled in the art or can be designed in connection with existing software. For example, program sections or program modules can be designed in or by means of Java, C, C++, Objective-C, MATLAB, or any other suitable programming language. Other programming languages are also contemplated.

The headings used in this disclosure are for provided merely for convenience to facilitate organization and description of the disclosure and exemplary embodiments. The headings are not limiting of the descriptions, disclosure, or examples. Nor are the headings exclusive of other subject matter in this disclosure, and it is understood that descriptions under different headings may be combined to better understand the subject matter of this disclosure.

Moreover, while some illustrative embodiments have been described herein, the scope of the invention is defined by the scope of the claims, and includes any and all embodiments having equivalent elements, modifications, omissions, combinations (e.g., of aspects across various embodiments), adaptations, or alterations, or combinations thereof, as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified, including by reordering steps, inserting or deleting steps, or combinations thereof, without departing from the principles disclosed herein. It is intended, therefore, that the specification and examples be considered as exemplary only, with a true scope and spirit of the invention being indicated by the following claims and their full scope of equivalents.

What is claimed is:

1. A measurement method, the method comprising:
transmitting a first signal from an originator device to a transponder device, the first signal having a first carrier frequency;
determining a carrier phase of the first signal at the transponder device;
transmitting a second signal from the transponder device to the originator device, the second signal having a second carrier frequency;
determining a carrier phase of the second signal at the originator device;
estimating a relative distance between the originator device and the transponder device using the carrier phase of the first carrier signal and the carrier phase of the second carrier signal, wherein the relative distance wraps across an upper boundary and a lower boundary;
adjusting the relative distance by unwrapping the relative distance outside at least one of the upper boundary and the lower boundary; and
using the adjusted relative distance to determine a total distance between the originator device and the transponder device.

2. The measurement method of claim 1, further comprising:
using a frequency difference between the first carrier frequency and the second carrier frequency to estimate the relative distance.

3. The measurement method of claim 1, wherein unwrapping the relative distance comprises:
adding a predetermined distance to the relative distance, the predetermined distance corresponding to a difference between the upper boundary and the lower boundary.

4. The measurement method of claim 1, wherein unwrapping the relative distance comprises:
subtracting a predetermined distance to the relative distance, the predetermined distance corresponding to a difference between the upper boundary and the lower boundary.

5. The measurement method of claim 1, wherein unwrapping the relative distance comprises:
determining a relative motion between the originator device and the transponder device over a predetermined time interval; and
adding the relative motion to the relative distance.

6. The measurement method of claim 5, wherein determining the relative motion comprises:
determining a rate of change of the carrier phase of the first signal at the transponder device;
determining a rate of change of the carrier phase of the second signal at the originator device; and
using the rate of change of the carrier phase of the first signal at the transponder device and the rate of change of the carrier phase of the second signal at the originator device to determine the relative motion.

7. The measurement method of claim 5, wherein determining the relative motion comprises:
estimating a plurality of relative distances between the originator device and the transponder device, the plurality of relative distances being calculated based on a plurality of carrier phases of a first plurality of signals transmitted from the originator device to the transponder device, a plurality of carrier phases of a second plurality of signals transmitted from the transponder device to the originator device, and a plurality of frequency differences between the carrier frequencies of the first plurality of signals and the carrier frequencies of the second plurality of signals;
estimating the relative motion based on a rate of change of the plurality of relative distances; and
adjusting the plurality of relative distances by unwrapping the plurality of relative distances across the upper boundary.

8. The measurement method of claim 5, wherein determining the relative motion comprises:
estimating a plurality of relative distances between the originator device and the transponder device, the plurality of relative distances being calculated based on a plurality of carrier phases of a first plurality of signals transmitted from the originator device to the transponder device, a plurality of carrier phases of a second plurality of signals transmitted from the transponder device to the originator device, and a plurality of frequency differences between the carrier frequencies of the first plurality of signals and the carrier frequencies of the second plurality of signals;
estimating the relative motion based on a rate of change of the plurality of relative distances; and
adjusting the plurality of relative distances by unwrapping the plurality of relative distances across the lower boundary.

9. The measurement method of claim 1, wherein using the adjusted relative distance to determine the total distance comprises:
determining an offset distance between the originator device and the transponder device; and
adding the offset distance to the adjusted relative distance.

10. The measurement method of claim 9, wherein determining the offset distance comprises:
performing a round-trip time-of-flight measurement between the originator device and the transponder device.

11. The measurement method of claim 5, further comprising:
estimating a future position of the transponder device using the relative distance and the relative motion.

12. The measurement method of claim 5, wherein using the adjusted relative distance to determine the total distance comprises:
updating an estimate of the total distance using a tracking filter, where the adjusted relative distance and the relative motion are inputs to the tracking filter.

13. A measurement system, comprising:
an originator device including a first radio, the originator device being configured to transmit a first signal to a transponder device using the first radio, the first signal having a first carrier frequency;
the transponder device including a second radio, the transponder device being configured to transmit a second signal to the originator device using the second radio, the second signal having a second carrier frequency; and
a processor configured to
estimate a relative distance between the originator device and the transponder device using a carrier phase of the first signal at the transponder device and a carrier phase of the second signal at the originator device, the relative distance being bounded by an upper boundary and a lower boundary,
adjust the relative distance by unwrapping the relative distance outside at least one of the upper boundary and the lower boundary, and
use the adjusted relative distance to determine a total distance between the originator device and the transponder device.

14. The measurement system of claim 13, wherein the processor is further configured to estimate the relative distance between the originator device and the transponder device using a frequency difference between the first carrier frequency and the second carrier frequency.

15. The measurement system of claim 13, wherein the processor is further configured to unwrap the relative distance by adding a predetermined distance to the relative distance, the predetermined distance corresponding to a difference between the upper boundary and the lower boundary.

16. The measurement system of claim 13, wherein the processor is further configured to unwrap the relative distance by subtracting a predetermined distance to the relative distance, the predetermined distance corresponding to a difference between the upper boundary and the lower boundary.

17. The measurement system of claim 13, wherein the processor is further configured to unwrap the relative distance by
determining a relative motion between the originator device and the transponder device over a predetermined time interval; and
adding the relative motion to the relative distance.

18. The measurement system of claim 17, wherein the processor is further configured to determine the relative motion by
determining a rate of change of the carrier phase of the first signal at the transponder device;
determining a rate of change of the carrier phase of the second signal at the originator device; and using the rate of change of the carrier phase of the first signal at the transponder device and the rate of change of the carrier phase of the second signal at the originator device to determine the relative motion.

19. The measurement system of claim 17, wherein the processor is further configured to determine the relative motion by
estimating a plurality of relative distances between the originator device and the transponder device, the plurality of relative distances being calculated based on a plurality of carrier phases of a first plurality of signals transmitted from the originator device to the transponder device, a plurality of carrier phases of a second plurality of signals transmitted from the transponder device to the originator device, and a plurality of frequency differences between the carrier frequencies of the first plurality of signals and the carrier frequencies of the second plurality of signals;
adjusting the plurality of relative distances by unwrapping the plurality of relative distances across the upper boundary to determine an adjusted plurality of relative distances; and
estimating the relative motion based on a rate of change of the adjusted plurality of relative distances.

20. The measurement system of claim 17, wherein the processor is further configured to determine the relative motion by
estimating a plurality of relative distances between the originator device and the transponder device, the plurality of relative distances being calculated based on a plurality of carrier phases of a first plurality of signals transmitted from the originator device to the transponder device, a plurality of carrier phases of a second plurality of signals transmitted from the transponder device to the originator device, and a plurality of frequency differences between the carrier frequencies of the first plurality of signals and the carrier frequencies of the second plurality of signals;
adjusting the plurality of relative distances by unwrapping the plurality of relative distances across the lower boundary to determine an adjusted plurality of relative distances; and
estimating the relative motion based on a rate of change of the adjusted plurality of relative distances.

21. The measurement system of claim 13, wherein the processor is further configured to use the adjusted relative distance to determine the total distance by
determining an offset distance between the originator device and the transponder device; and
adding the offset distance to the adjusted relative distance.

22. The measurement system of claim 21, wherein the processor is further configured to determine the offset distance by performing a round-trip time-of-flight measurement between the originator device and the transponder device.

23. The measurement system of claim 17, wherein the processor is further configured to estimate a future position of the transponder device using the relative distance and the relative motion.

24. The measurement system of claim 17, wherein the processor is further configured to use the adjusted relative distance to determine the total distance by updating an estimate of the total distance using a tracking filter, where the adjusted relative distance and the relative motion are inputs to the tracking filter.

* * * * *